United States Patent [19]

Murasaki et al.

[11] Patent Number: 5,133,541

[45] Date of Patent: Jul. 28, 1992

[54] TRANSPORT DEVICE FOR TRANSPORTING RECORDING MEDIUM

[75] Inventors: Sadanobu Murasaki; Yukiyoshi Yamakoshi; Kiyoshi Nakamura, all of Osaka, Japan

[73] Assignee: Minolta Camera Kabushiki Kaisha, Osaka, Japan

[21] Appl. No.: 711,399

[22] Filed: Jun. 6, 1991

Related U.S. Application Data

[63] Continuation of Ser. No. 344,087, Apr. 27, 1989, abandoned.

[30] Foreign Application Priority Data

Apr. 28, 1988 [JP] Japan ............................ 63-105700
Apr. 28, 1988 [JP] Japan ............................ 63-105701
Aug. 12, 1988 [JP] Japan ........................ 63-106790[U]

[51] Int. Cl.$^5$ ..................................... B65H 29/20
[52] U.S. Cl. .................................. 271/176; 271/186; 271/291; 271/902
[58] Field of Search ............... 271/176, 186, 902, 291

[56] References Cited

U.S. PATENT DOCUMENTS 3,523,687  8/1970  Peterson ........................ 271/186
4,486,012 12/1984  Bock ........................... 271/186 X
4,579,446  4/1986  Fujino .......................... 271/186
4,804,175  2/1989  Grandjean ..................... 271/902 X

FOREIGN PATENT DOCUMENTS 62-29359  2/1987  Japan .
62-18594  5/1987  Japan .

Primary Examiner—Richard A. Schacher
Attorney, Agent, or Firm—Burns, Doane, Swecker & Mathis

[57] ABSTRACT

The present invention discloses a transport device for transporting a recording medium comprising an inlet channel formed by a first guide member, a switching channel formed by a second guide member and communicating with said inlet channel, an outlet channel formed by a third guide member and connected to the junction of the inlet channel and said switching channel, transport member located at the upstream of the junction of the inlet channel and the switching channel with respect to a recording medium transport direction for transporting the recording medium through the inlet channel into the switching channel and reverse member located at the junction of the inlet channel, the switching channel and the outlet channel for backwardly transporting the recording medium into the outlet channel as released from the transport member after the recording medium is transported into the switching channel.

12 Claims, 20 Drawing Sheets

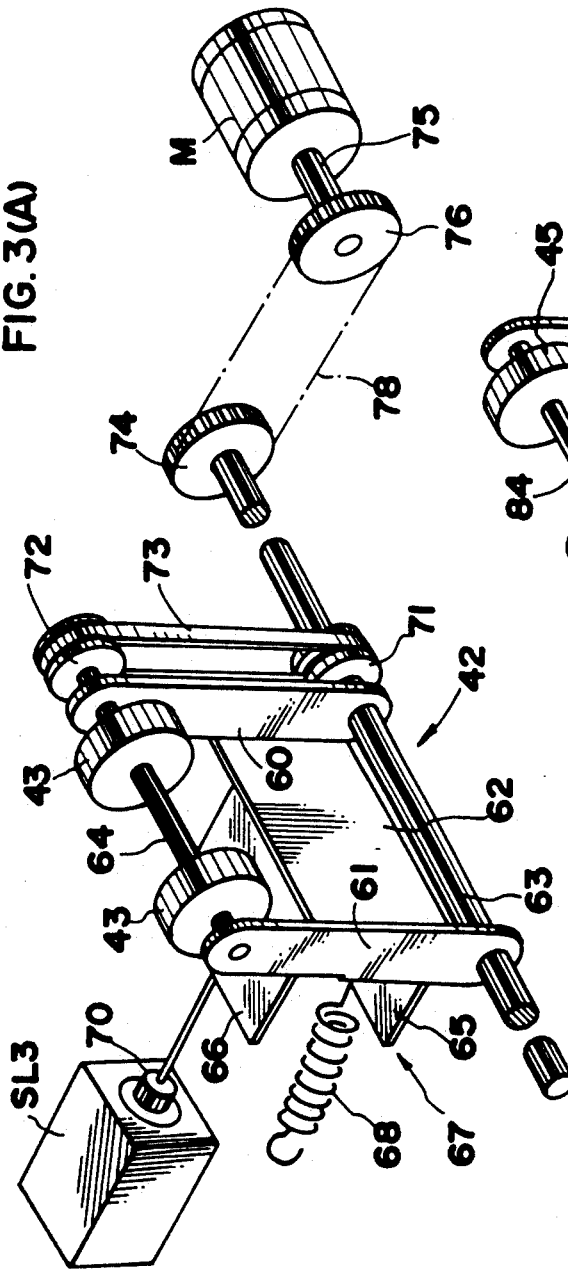
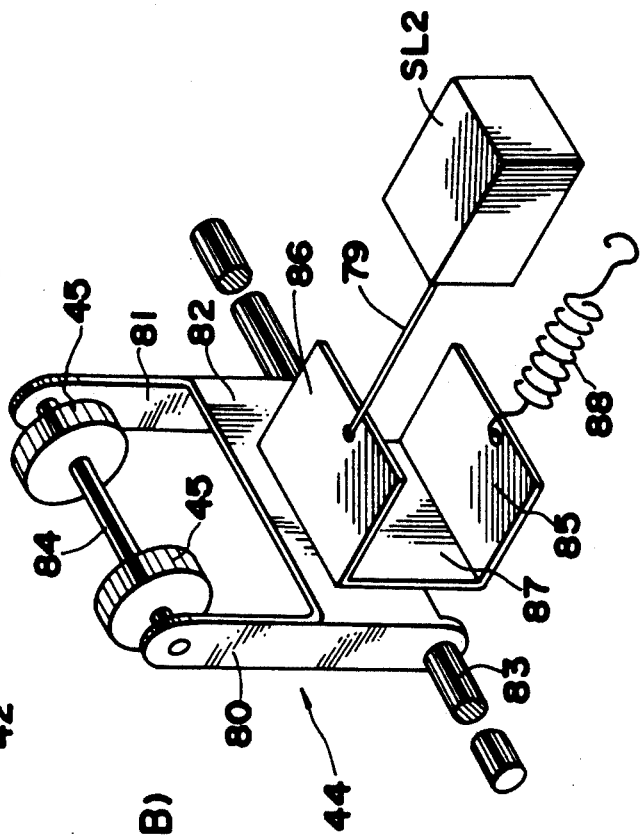
FIG. 3(A)
FIG. 3(B)

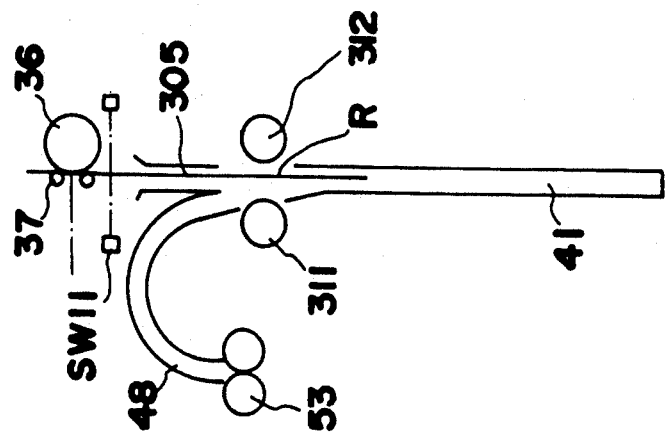
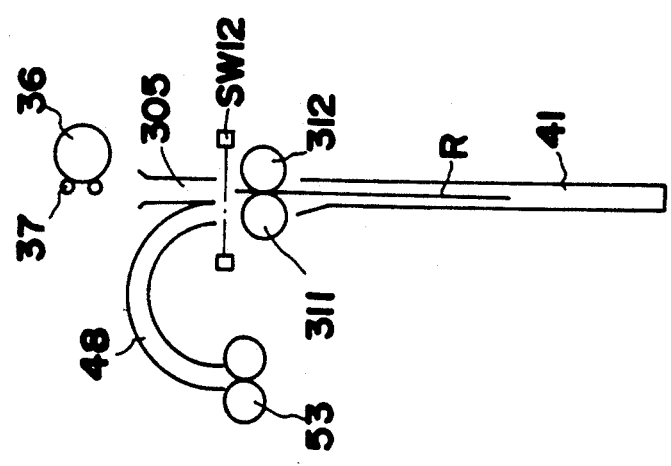
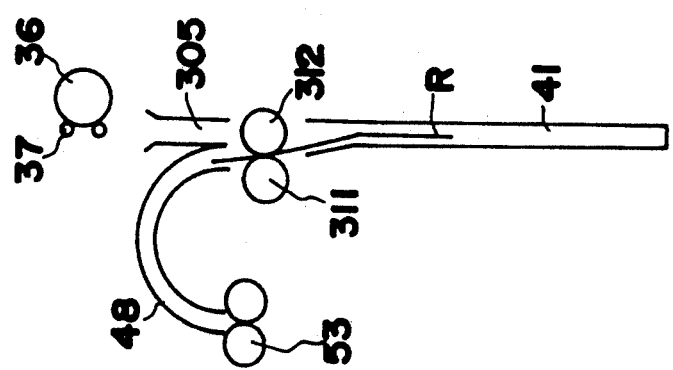

TRANSPORT DEVICE FOR TRANSPORTING RECORDING MEDIUM

This application is a continuation, of application Ser. No. 344,087, filed Apr. 27, 1989 now abandoned.

BACKGROUND OF THE INVENTION

1. Field of the Invention

The present invention relates to devices for changing the direction of recording medium for use in image forming apparatus such as laser beam printers, copying machines or printing presses.

2. Description of the Related Art

Copying machines having the duplex copying function of forming images on both surface of copy paper or those having the composite copying function of repeatedly forming images on one surface of copy paper have incorporated therein a device for changing the direction of transport of copy paper on completion of the first copying cycle for the paper. The direction changing device (hereinafter referred to as the "switchback device") is adapted to move the copy paper or like recording medium forward and backward, so that the device, which is capable of changing the direction of the recording medium, further has the advantage of eliminating the need to incorporate an elongated bent transport channel into the copying machine or like image forming apparatus for changing the direction of the medium.

Laser printers also include such a switchback device for changing the direction of recording media with the above advantage.

The conventional switchback devices of the type mentioned include those disclosed in Japanese Utility Model Publication No. 62-18594 and Japanese Laid-Open Patent Application No. 62-29359.

The switchback device disclosed in the former comprises three rollers, i.e., a central roller and two rollers arranged on opposite sides of the central roller in contact therewith. The nip of one of the side rollers and the central roller is positioned within an inlet channel, and the nip of the other side roller and the central roller is positioned within an outlet channel. In this arrangement, the recording medium is sent from the inlet channel into a switchback portion ahead of the channel, whereupon the medium is sent backward into the outlet channel. In these channels, the recording medium is transported by the rollers, so that with laser printers of the type wherein the laser scanning station is positioned upstream from the inlet channel with respect to the direction of transport of the medium, there is the problem that the transport of the medium through the scanning station must be timed with the transport thereof by the rollers.

With the switchback device disclosed in the latter, the recording medium is advanced into a switchback portion from an inlet channel and is thereafter sent out into an outlet channel by the elastic force of a spring member. However, the recording medium, when moved by the spring member, will jam the channel if the medium is low in stiffness, i.e., in strength. Further in the case where the device is used for different kinds of recording media having varying lengths, the spring force acting on recording media differs with the length. It is therefore difficult to select a spring member having optimum characteristics.

SUMMARY OF THE INVENTION

The main object of the present invention is to provide an image forming apparatus wherein recording media are smoothly transportable free of jamming.

Another object of the invention is to provide an image forming apparatus wherein the direction of the recording medium can be changed reliably by a simple construction.

Still another object of the invention is to provide an image forming apparatus wherein the direction of the recording medium can be changed in a minimized space.

These objects can be fulfilled by providing a switchback device having a recording medium inlet channel formed by a first guide member, a switchback channel formed by a second guide member and communicating with said inlet channel, a recording medium outlet channel formed by a third guide member and connected to the junction of the inlet channel and said switchback channel, transport means located at the upstream of the junction of the inlet channel and the switchback channel with respect to a recording medium transport direction for transporting the recording medium through the inlet channel into the switchback channel and reverse means located at the junction of the inlet channel, the switchback channel and the outlet channel for backwardly transporting the recording medium into the outlet channel as released from the transport means after the recording medium is transported into the switchback channel.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like Parts are designated by like reference numerals throughout the several drawings

FIG. 3 (A) is a perspective view of the drive rollers shown in FIG. 2.

FIG. 3 (B) is a perspective view of the driven rollers shown in FIG. 2.

FIG. 10 (B) is a sectional view showing the switchback roller of FIG. 10 (A) as advanced into the switchback channel.

FIG. 15 (B) is a sectional view of drive and driven rollers of FIG. 15 (A), the view showing the rollers as advanced into the junction of the inlet channel and the switchback channel.

FIG. 15 (C) is a sectional view of drive and driven rollers of FIG. 15 (A), the view showing the rollers as advanced into the junction of an outlet channel and the switchback channel.

FIGS. 17 (A), (B) and (C) are diagrams showing stepwise the operation of the switchback device included in the fourth embodiment.

DESCRIPTION OF THE PREFERRED EMBODIMENTS

The present invention will be described below in detail with reference to the illustrated embodiments thereof.

Figure 1:
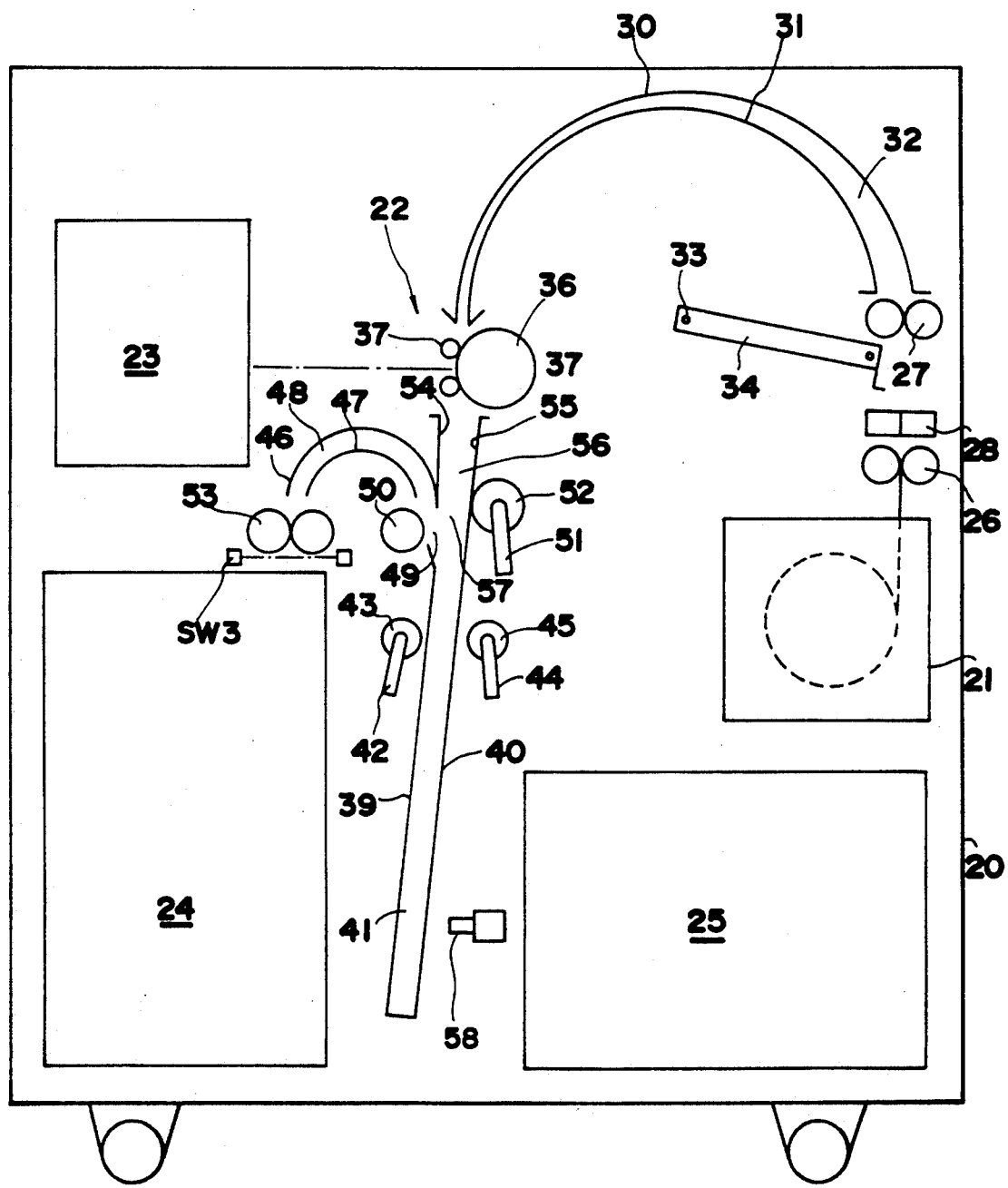
FIG. 1 is a sectional view schematically showing a laser printer having incorporated therein a first embodiment of the invention, i.e. a switchback device for recording medium.

Referring to FIG. 1, a housing 20 providing the body of a laser printer has removably accommodated therein a magazine 21 at the right side of the housing shown in the midportion of its height. The magazine 21 contains a roll of recording medium such as a sensitized paper or photosensitive film coated with a photosensitive composition. The recording medium is paid off from the magazine 21 and cut into a sheet of specified length, which is transported to a scanning station 22. Disposed inside the housing 20 at the left-side upper portion thereof is an optical unit 23 which projects a laser beam on the medium transported to the scanning station, whereby the medium is exposed to an image. The exposed medium is transported into a developing unit 24 positioned below the optical unit 23. The medium developed in the unit 23 is discharged from the housing 20. The operation of components accommodated in the housing 20 is controlled by a control unit 25 provided inside the housing 20.

To pay off the medium contained in the form of a roll within the magazine 21, a pair of delivery rollers 26 is disposed in the housing 20 downstream from the magazine 21 with respect to the direction of transport of the medium. Disposed above these rollers 26 is a pair of transport rollers 27 for transporting the medium paid off by the rollers 26. A cutter unit 28 is interposed between the pair of delivery rollers 26 and the pair of transport rollers 27 for cutting the strip of medium delivered from the magazine 21 into sheets of specified length.

An upper guide plate 30 and a lower guide plate 31, each in the form of a circular arc, are provided between the pair of transport rollers 27 and the scanning station 22 to provide a transport channel 32 for guiding medium sheets. Accordingly, the medium paid off from the magazine 21 by the delivery rollers 26 is cut into a sheet of specified length by the cutter unit 28, with its leading end nipped by the transport rollers 27, and the sheet is forwarded through the transport channel 32 to the scanning station. To transport the medium sheet through the channel 32, a push lever 34 engageable with the rear end of the sheet is secured to a pivot 33.

The exposure station 22 is provided by a platen drum 36 having a large diameter and two transport rollers 37 having a small diameter and pressed against the drum 36. The laser beam is projected on the medium at a position between the transport rollers 37, with the medium held between the platen drum 36 and the transport rollers 37, whereby the medium is exposed to an optical image. More specifically, the medium is scanned by the laser beam from the optical unit 23 widthwise of the medium, i.e., perpendicular to the direction of transport of the medium, while the medium is being transported, whereby the image is formed on the surface of the medium.

A pair of guide plates 39, 40 spaced apart from each other by a specified distance and extending downward are disposed downstream from the scanning station 22 with respect to the medium transport direction to thereby provide a channel 41 for changing the medium transport direction (hereinafter referred to as the "switchback channel 41") when the exposed medium is placed therein. To move the medium downward and upward in the switchback channel 41, a pair of drive rollers 43 is supported by the upper end of a pivotal member 42 rotatably, and a pair of driven rollers 45 is rotatably supported by the upper end of a pivotal member 44. These pairs of rollers 43, 45 are movable toward or away from each other by the pivotal members 42, 44 and thus adapted to advance into the switchback channel 41.

To transport the medium within the switchback channel 41 from this channel 41 into the developing unit 24, an upper guide plate 46 and a lower guide plate 47, spaced apart from each other and each in the form of a circular arc, are disposed between the developing unit 24 and the guide plate 39 to provide an outlet channel 48. The outlet channel 48 is provided at a communication opening 49 formed in the guide plate 39. To transport the medium from the switchback channel 41 into the developing unit 24 via the outlet channel 48, a drive roller 50 is installed at the position of the communication opening 49, a pair of switchback rollers 52 supported by the upper end of a pivotal member 51 is movable into or out of pressing contact with the drive roller 50, and a pair of feed rollers 53 is interposed between the developing unit 24 and the downstream ends, with respect to the medium transport direction, of the guide plates 46, 47.

The guide plate 39 has an upper end portion 54 providing a vertical guide face. On the other hand, the guide plate 40 includes an upper end portion 55 having a guide face slanting like the other guide face of the guide plate 40. Accordingly, these upper end portions 54 and 55 define a space slightly flaring toward their upper extremities providing an inlet for the medium. The space serves as an inlet channel 56 through which the recording medium passing through the scanning station 22 is transported into the switchback channel 41. The inlet channel 56 communicates with the switchback channel 41 at a junction 57.

The switchback rollers 52 move into or out of the junction 57 and the communication opening 49 when brought into or out of pressing contact with the drive roller 50.

Since the inlet channel 56 and the switchback channel 41 formed by the guide plates 39, 40 extend straight downward from the scanning station 22, the recording medium delivered from the scanning station 22 is freely transported downward. The medium sheet as completely scanned has its direction changed within the switchback channel 41 and then transported through the outlet channel 48 into the developing unit 24 at its upper portion. The exposed side of the recording medium is oriented as specified by the recording medium being fed to the developing unit 24 from its upper portion via the switchback channel 41. Further because the recording medium as released from the nipping engagement with the transport rollers 37 and the platen drum 36 is transported into the developing unit 24 by the pair of feed rollers 53, the medium is transported into the unit 24 at a predetermined speed irrelevant to the speed of transport by the transport rollers 37. Although the scanned medium is transportable into the developing unit 24 also via a transport channel extending from the lower ends of the guide plates 39, 40 to the upper portion of the unit 24, the illustrated arrangement wherein the medium is accommodated in the switchback channel 41 and thereafter reversely transported from the channel 41 makes it possible to transport the medium into the developing unit 24 with the guide plates 39, 40 which are relatively short in the overall length without using such an elongated additional channel.

When the medium passing through the scanning station 22 is transported into the inlet channel 56 by the transport rollers 37 serving as transport means, the rollers 43, 45, 50 and 52 are held out of contact with medium, so that on leaving the station 22, the medium falls under gravity through the switchback channel 41 toward its lower end which is closed. The drive rollers 43 and the driven rollers 45 need to hold the medium before the medium reaches the lower end. To ensure this, it is desirable to provide a stopper 58 which is movable into the switchback channel 41 as seen in FIG. 1. The stopper 58 is so driven, for example, by an unillustrated solenoid.

Figure 2:
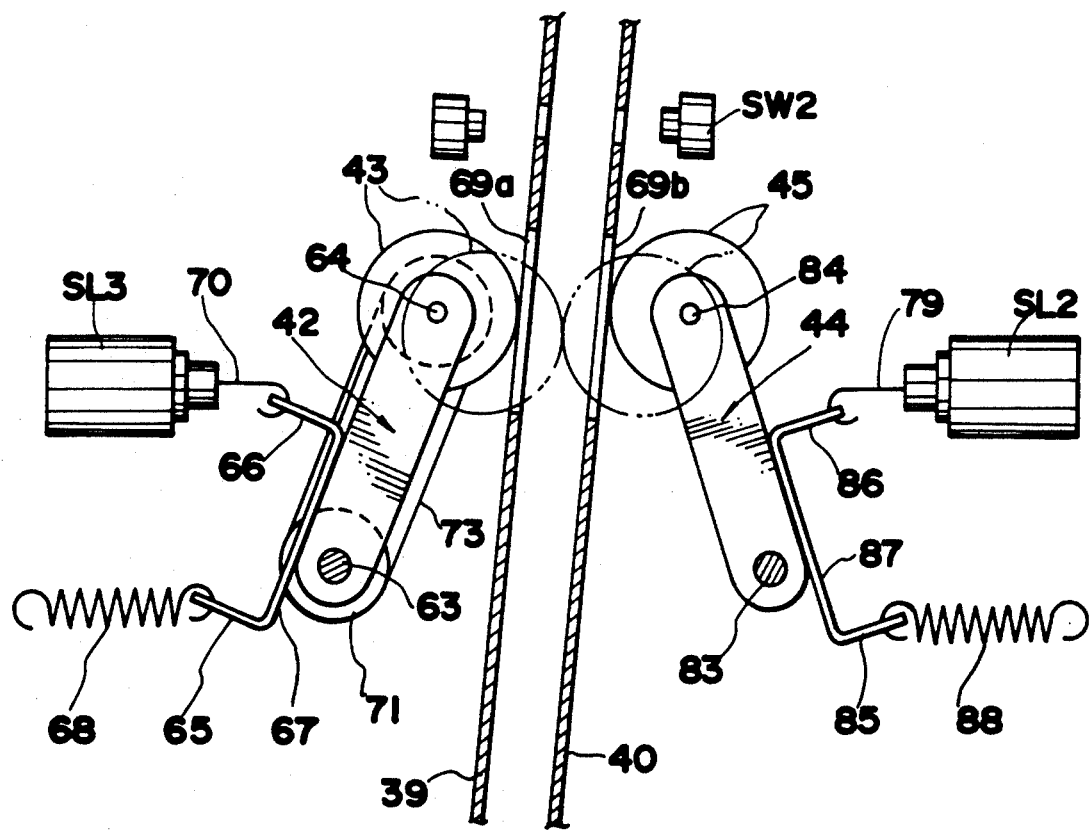
FIG. 2 is a sectional view showing the reverse means of FIG. 1.

FIG. 2 and FIGS. 3 (A) and (B) show the drive rollers 43, the driven rollers 45 and drive means therefor in greater detail.

With reference to FIG. 3 (A), the pivotal member 42 comprises two lever portions 60, 61 spaced apart by a specified distance and a plate 62 interconnecting these portions integrally therewith. The pivotal member 42 is rotatably mounted on a drive shaft 63 at the lower ends of the lever portions 60, 61. A rotary shaft 64 fixedly carrying the two drive rollers 43 is rotatably supported by the upper ends of the lever portions 60, 61.

Secured to the connecting plate 62 is a channel-shaped bracket 67 having two connecting portions 65, 66. A coiled compression spring 68 has one end engaged with the connecting portion 65 and the other end attached to an unillustrated part within the printer housing 20. The spring 68 biases the pivotal member 42 clockwise in FIGS. 1 and 2, thereby causing the pivotal member 42 to bring the drive rollers 43 to the position indicated in a two-dot-and-dash line in FIG. 2, inside the switch-back channel 41 through openings 69a formed in the guide plate 39. The plunger 70 of a solenoid SL3 is engaged with the connecting portion 66 for returning the pivotal member 42 to the solid-line position shown in FIGS. 1 and 2 against the elastic force of the spring 68.

As shown in FIG. 3 (A), a pulley 71 is fixed to the drive shaft 63, and a pulley 72 to the rotary shaft 64. A belt 73 is reeved around these pulleys 71, 72. A chain 78 is reeved around a gear 74 mounted on the drive shaft 63 and a gear 76 on the shaft 75 of a motor M. The rotation of the motor shaft 75 is transmitted to the drive rollers 43 via the drive shaft 63, the belt 73, etc.

As seen in FIG. 3 (B), the pivotal member 44, like the pivotal member 42, comprises two lever portions 80, 81 and a connecting plate 82 integral therewith, and is rotatably mounted at the lower ends of the lever portions 80, 81 on a support shaft 83 secured to the printer housing 20. The two driven rollers 45 as opposed to the respective drive rollers 43 are rotatably mounted on a support shaft 84 attached to the upper ends of the lever portions 80, 81. Secured to the connecting plate 82 is a bracket 87 which, like the bracket 67, has two connecting portions 85, 86. A coiled tension spring 88 is engaged at its one end with the connecting portion 85. The elastic force of the spring 88 biases the pivotal member 44 counterclockwise in FIG. 2, thereby advancing the driven rollers 45 into the switchback channel 41 through openings 69b formed in the guide plate 40. A solenoid SL2 has a plunger 79 in engagement with the other connecting portion 86 for returning the pivotal member 44 against the elastic force of the spring 88.

Figure 4:
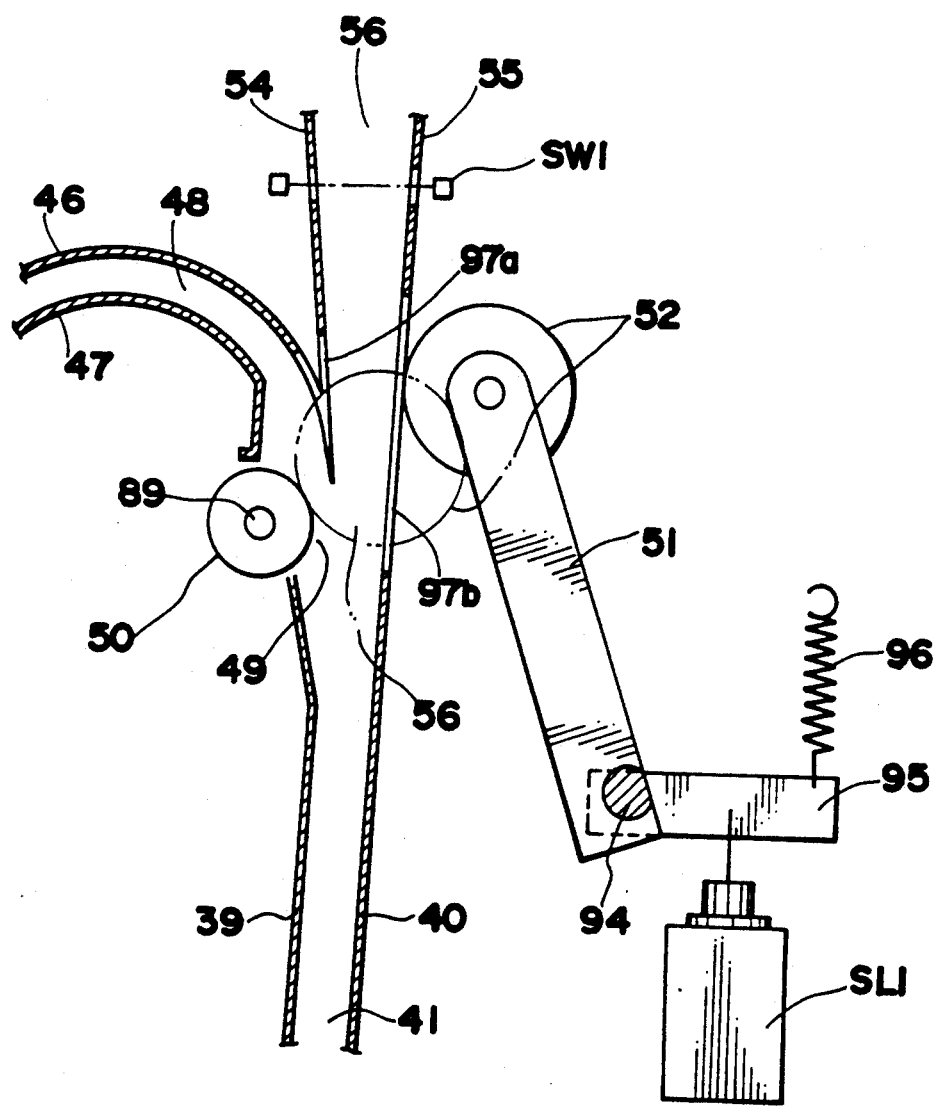
FIG. 4 is a sectional view of the switchback means shown in FIG. 1.
Figure 5:
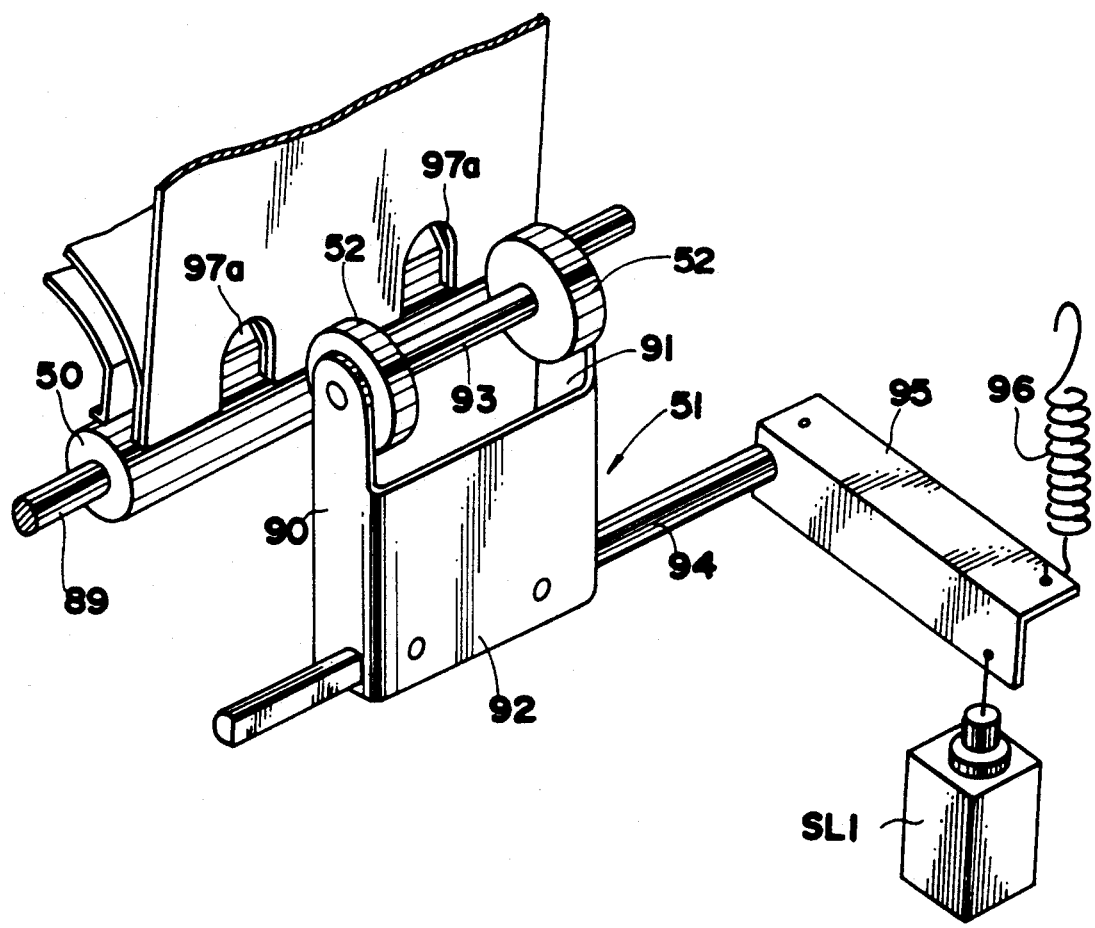
FIG. 5 is a fragmentary perspective view of the switchback means shown in FIG. 4.

FIGS. 4 and 5 show an arrangement including the drive roller 50 and the switchback rollers 52 of FIG. 1 on an enlarged scale.

The drive roller 50 is fixed to a support shaft 89 coupled to the motor M by an unillustrated chain and is driven by the motor M. The pivotal member 51 comprises two lever portions 90, 91 and a connecting plate 92 integral therewith. The two switchback rollers 52 are rotatably mounted on a support shaft 93 attached to the upper ends of the lever portions 90, 91. The pivotal member 51 is attached at its lower end to the pivot 94. Attached to one end of the pivot 94 is one end of a connecting member 95 which is L-shaped in cross section.

A coiled tension spring 96 is engaged at its one end with the other end of the connecting member 95 for biasing the pivotal member 51 counterclockwise in FIGS. 1 and 4. The other end of the spring 96 is in engagement with an unillustrated part inside the housing 20. The switchback rollers 52 are brought into pressing contact with the drive roller 50 by the elastic force of the spring 96 as indicated in a broken line in FIG. 4.

For the pivotal member 51 to press the switch-back rollers 52 against the drive roller 50 as stated above, the guide plate 39 is formed with openings 97a equal in number to the number of the rollers 52. Opposed to the respective openings 97a are similar openings 97b formed in the guide plate 40 as illustrated in FIG. 4. The switchback rollers 52 are two in number to reduce the width of the openings 97a, 97b axially of the drive roller 50 and to thereby preclude the engagement of the medium with the guide plate opening portions. For the same reason, the drive rollers 43, as well as the driven rollers 45, are two in number. Depending on the width of the media to be used, more than two or one such roller may be mounted on each pivotal member.

A sensor SW1 is disposed above the drive roller 50 and the switchback rollers 52 for detecting the recording medium passing through the scanning station 22 as seen in FIG. 4. A sensor SW2 is disposed above the drive rollers 43 and the driven rollers 45 for detecting the medium brought into the switchback channel 41 as shown in FIG. 2. Each of the sensors SW1 and SW2 comprises a transmitter for transmitting ultrasonic waves and a receiver for receiving the wave, such that the ultrasonic wave, when blocked by the medium, indicates the presence of the medium at the position concerned. However, the sensor SW1 may be of the type adapted to receive the laser beam emitted by the optical unit 23 upon reflection at the surface of the platen drum 36 to detect the medium passing through the position. Alternatively, completion of exposure of the medium may be detected to detect the passage of the medium through the specified position without using a specific sensor.

A sensor SW3 is provided at the inlet of the developing unit 24 for detecting the medium reaching the position of the feed rollers 53 shown in FIG. 1. The sensor SW3 is also of the ultrasonic type like the sensors SW1 and SW2 but can be of some other type, such as a limit switch, insofar as the presence of the medium is thereby detectable. The pair of feed rollers 53 is driven also by the motor M; the shaft supporting one of the feed rollers 53 is coupled to the shaft 75 of the motor M by an unillustrated chain.

Figure 7:
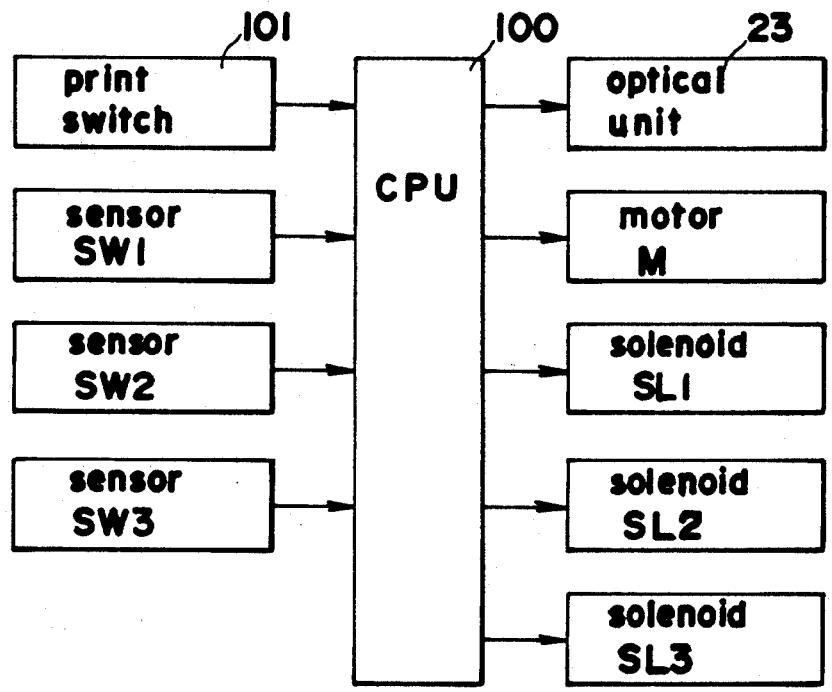
FIG. 7 is a block diagram showing a control system for the switchback device of the first and a second embodiments.

FIG. 7 is a diagram showing a control circuit for operating the switchback device of the invention. A print switch 101 for initiating the laser printer into printing operation is connected to a microcomputer or like CPU 100. The sensors SW1, SW2 and SW3 are also connected to the CPU 100. The CPU 100 feeds a control signal to the optical unit 23 and also control signals to the motor M and the three solenoids SL1 to SL3.

Figure 8:
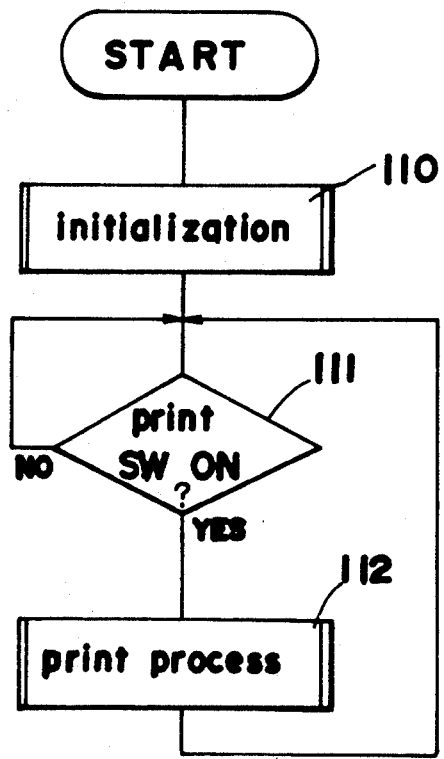
FIG. 8 is a flow chart showing the operation process to be executed by the control system of FIG. 7 according to the first and the second embodiments.

FIG. 8 is a main flow chart showing the control process for the laser printer incorporating the switch-back device of the invention. When the laser printer is started up, the control system is initialized in step 110. When the print switch 101 is found to be on in this state in step 111, step 112 follows to execute a print process routine.

Figure 9:
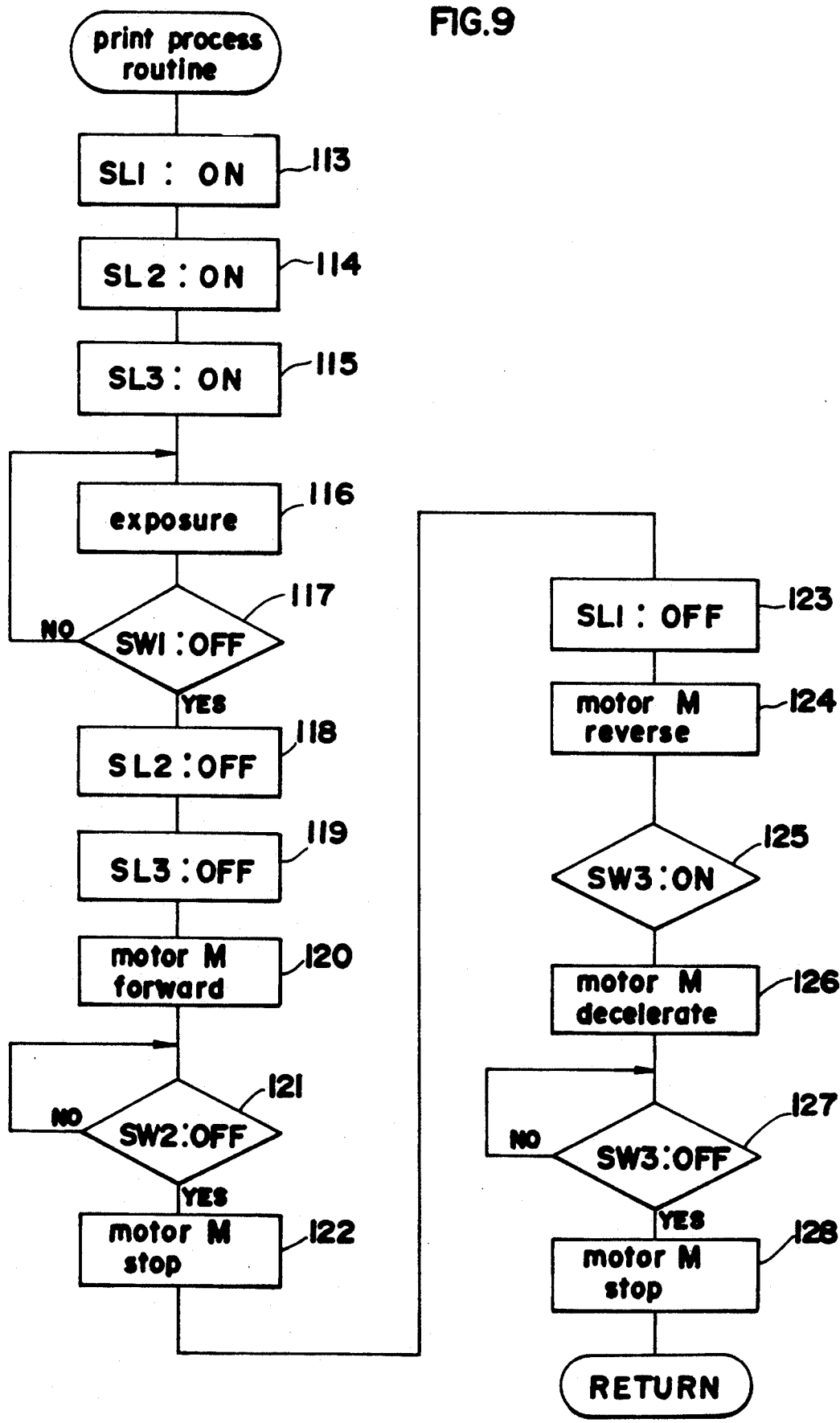
FIG. 9 is a flow chart showing the print process subroutine of FIG. 8 in detail.

FIG. 9 is a flow chart showing the print process routine of step 112 in detail. This routine will be described with reference to FIGS. 6 (A) to (C) showing the operation of the switchback device of the invention.

Figure 6B:
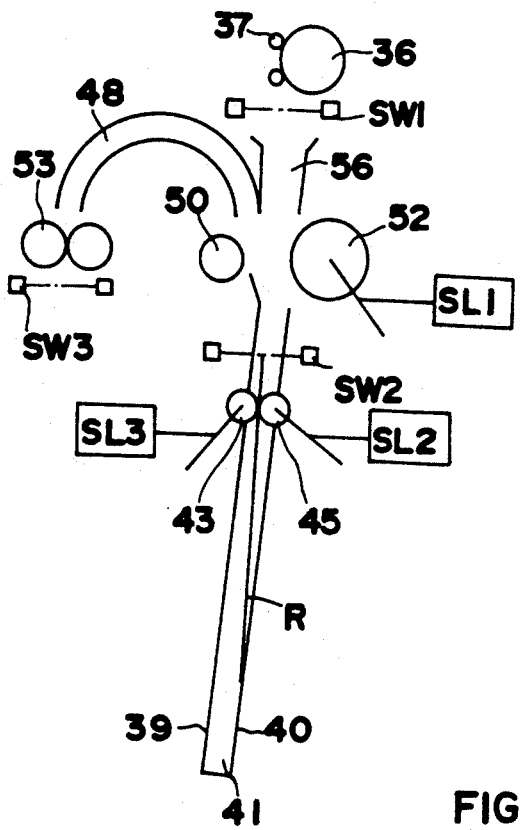
FIGS. 6 (A), (B) and (C) are diagrams showing stepwise the operation of the switchback device.
Figure 6A:
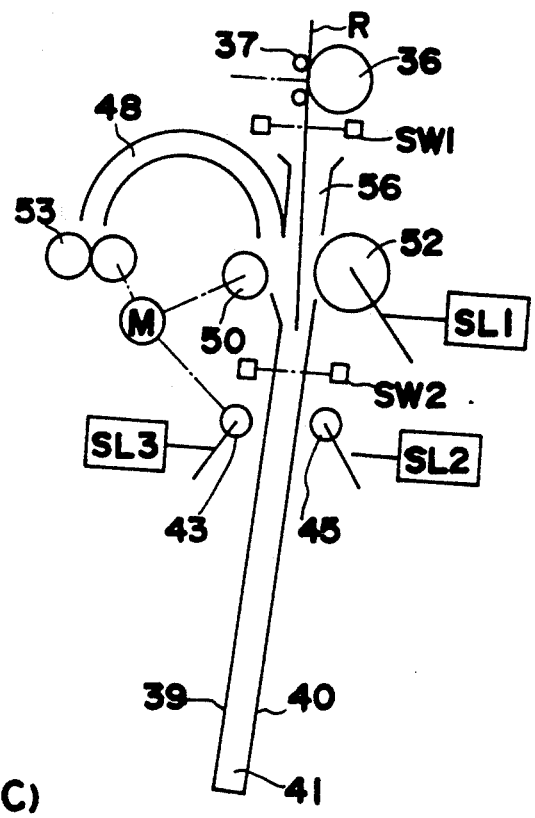
Figure 6C:
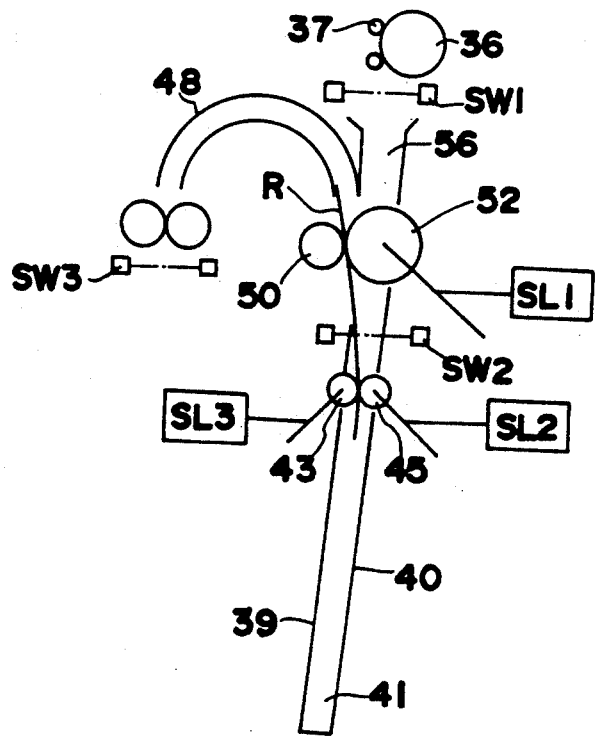

The recording medium accommodated as rolled up within the magazine 21 is paid off therefrom, and a medium sheet R of specified length is cut off by the cutter unit 28 and transported through the channel 32 by the push lever 34. When the leading end of the medium R is brought to the scanning station 22, the medium is exposed to a laser beam at the scanning station 22. Before the exposure, the three solenoids SL1 to SL3 are energized in steps 113 to 115, respectively, whereby the switchback rollers 52 are moved away from the drive roller 50 against the elastic force of the spring 96, and the drive rollers 43 and the driven rollers 45 are moved away from each other against the springs 68, 88. Consequently, the inlet channel 56 and the switchback channel 41 are cleared of the blocking rollers as seen in FIG. 6 (A).

In this state, the medium R is transported as held between the platen drum 36 and the transport rollers 37, and is exposed to the laser beam from the optical unit 23 in step 116, whereby the medium R is exposed to an image. The exposed portion of the medium R is brought into the switchback channel 41 through the inlet channel 56. At this time, the drive roller 50, switch-back rollers 52, drive rollers 43 and driven rollers 45 are all away from the medium R without holding the medium R as seen in FIG. 6 (A), permitting the transport rollers 37 only to transport the medium into the switchback channel 41.

When the medium sheet has been completely exposed to the contemplated image, the medium R falls under gravity. Upon the sensor SW1 detecting the passage of the medium rear end in step 117, the solenoids SL2, SL3 are deenergized in steps 118, 119. This causes the springs 68, 88 to bring the drive rollers 43 and the driven rollers 45 into the switchback channel 41 through the openings 69a, 69b, respectively, as shown in FIG. 6 (B), with the result that the medium R is nipped between the drive rollers 43 and the driven rollers 45.

In the case where the stopper 58 is advanced into the channel 41 for the stopper 58 to support the lower end of the medium R as stated above, the stopper 58 is retracted after the medium R has been nipped in steps 118, 119.

In this state, the motor M is driven forward in step 120 to further lower the medium R to a position lower than is shown in FIG. 6 (B). Consequently, the sensor SW2 detects in step 121 the rear end of the medium R as lowered below the sensor SW2, whereupon the motor M is deenergized in step 122. The solenoid SL1 is deenergized in step 123, whereupon the switchback rollers 52 advance into the junction 56 through the openings 97a, 97b to come into pressing contact with the drive roller 50 as seen in FIG. 6 (C).

When the motor M is reversely rotated in step 124, the medium R is raised from the switchback channel 41 toward the outlet channel 48. The medium R is first pulled up by the drive rollers 43 and the driven rollers 43, then sent into the outlet channel 48 by the drive roller 50 and the switchback rollers 52 and transported through the channel 48. Upon the sensor SW3 detecting the medium R reaching the inlet of the developing unit 24 in step 125, the motor M is decelerated in step 126 to a speed corresponding to the developing speed within the unit 24.

The motor M is stopped in step 128 upon the sensor SW3 detecting in step 127 the medium rear end, i.e., the medium R as completely brought out of the outlet channel 48. Thus, the medium R passing through the scanning station 22 has been completely transported into the developing unit 24. The solenoids SL1 to SL3 may be energized simultaneously with the actuation of the sensor SW3 in step 125.

Next, another switchback device will be described which is a second embodiment of the invention. The second embodiment of the invention has substantially the same construction as the first embodiment except that a pivotal member 150 for each switchback roller 52 is provided with a guide member 206. The guide member 206 provided for the pivotal member 150 eliminates the likelihood that the leading end of the recording medium being transported backward will be brought to one side of the switchback roller 52 opposite to the other side thereon in pressing contact with the drive roller 50. The recording medium can therefore be transported into the outlet channel 48 reliably.

Figure 10A:
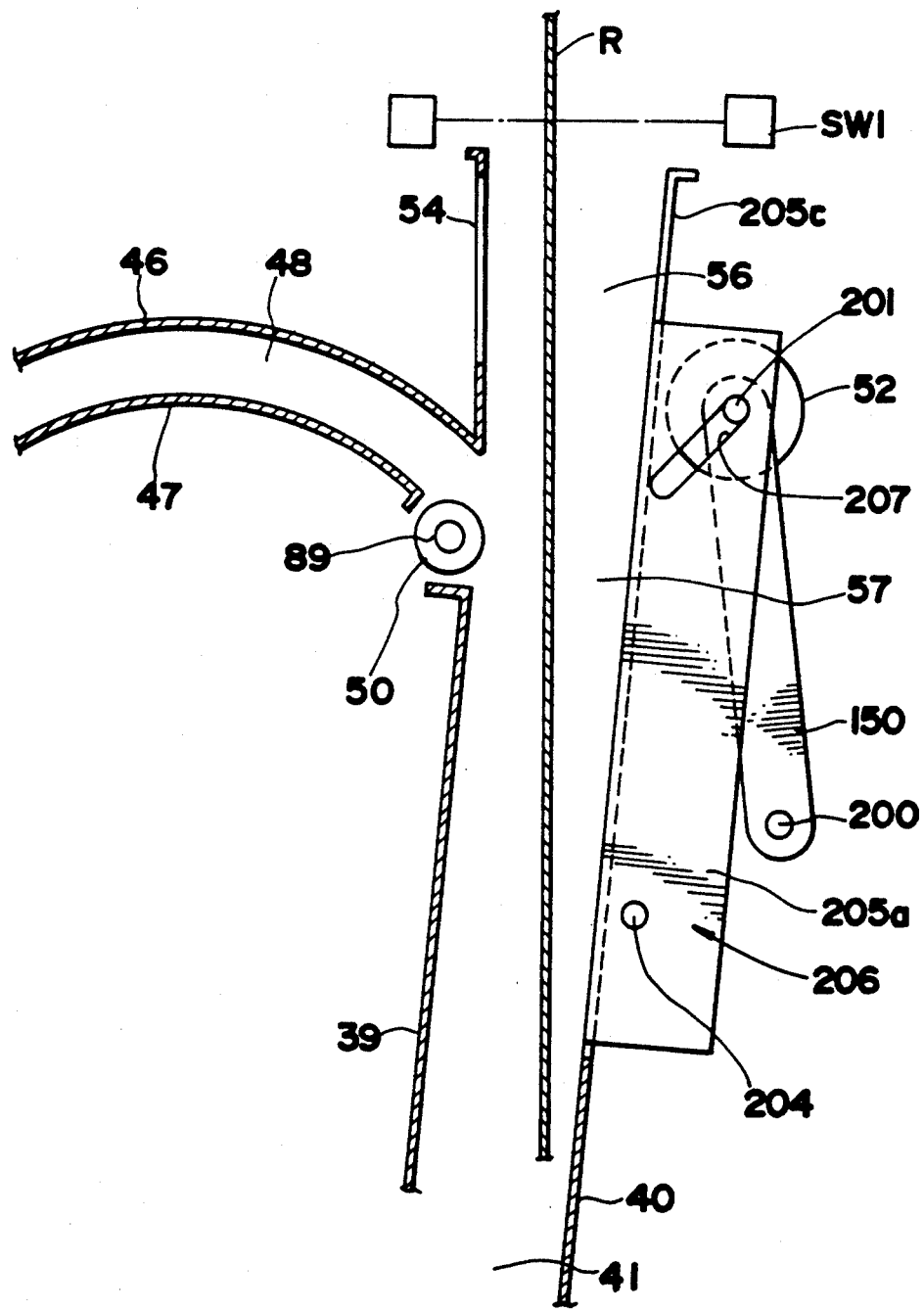
FIG. 10 (A) is a sectional view of a switchback roller included in a second embodiment of the invention, i.e. another switchback device for recording medium, the view showing the roller as retracted from a switchback channel.
Figure 10B:
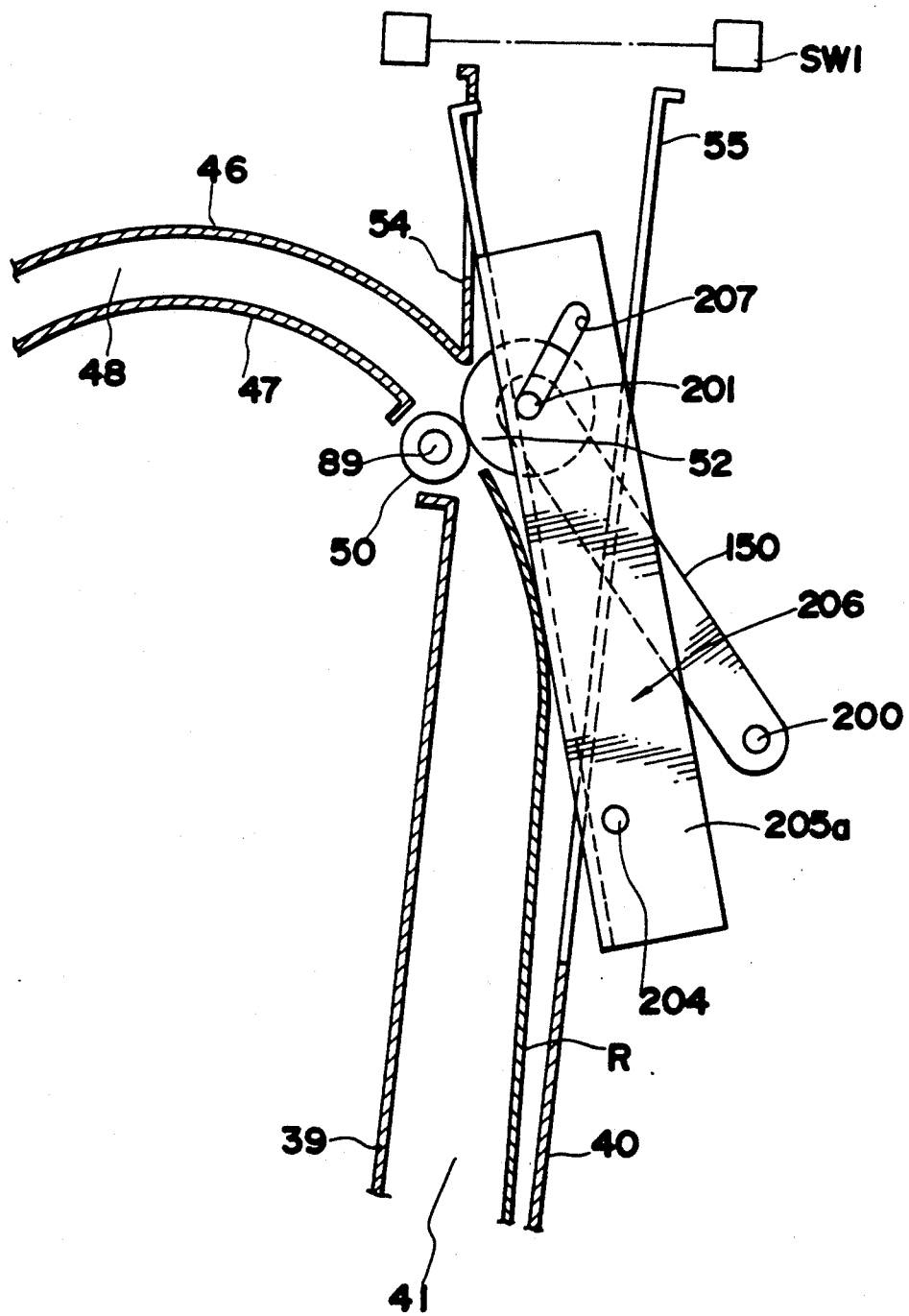
Figure 11:
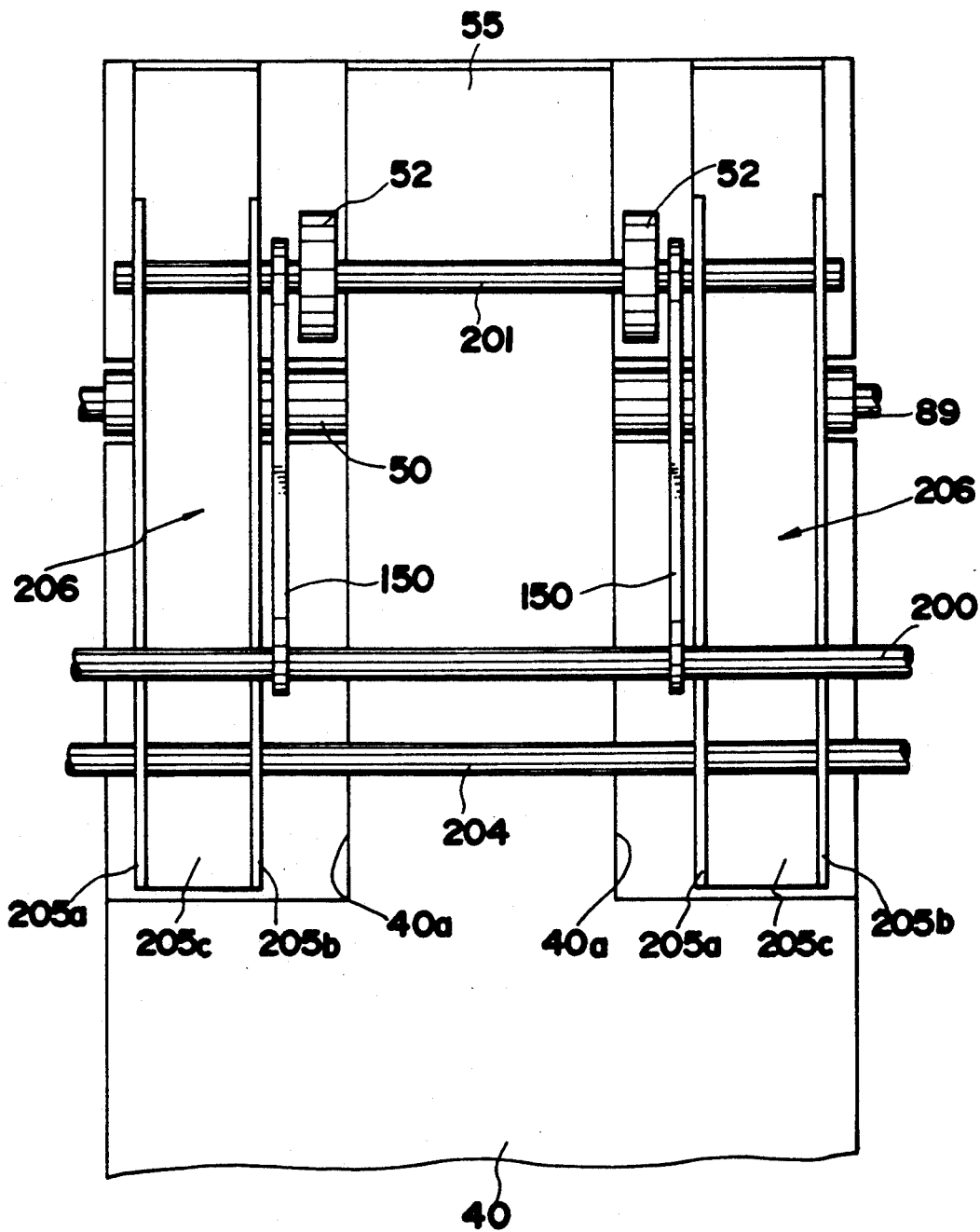
FIG. 11 is a right side elevation of FIG. 10 (A).

With reference to FIGS. 10 (A) and (B), and FIGS. 11 and 12, a description will be given of the drive roller 50 and the switchback rollers 52 included in the switchback device according to the second embodiment.

The drive roller 50 is fixed to a support shaft 89 coupled to the motor M by an unillustrated chain or the like and is driven by the motor M. The two pivotal members 150 are fixed to a rotary shaft 200 rotatably supported by an unillustrated frame or fixed member provided within the printer housing 20. As seen in FIGS. 11 and 12, the two pivotal members 150 are secured, each at its one end, to the rotary shaft 200. A support shaft 201 is attached to the pivotal members 150 at the other end of each. The switchback rollers 52 are rotatably mounted on the support shaft 201.

Figure 12:
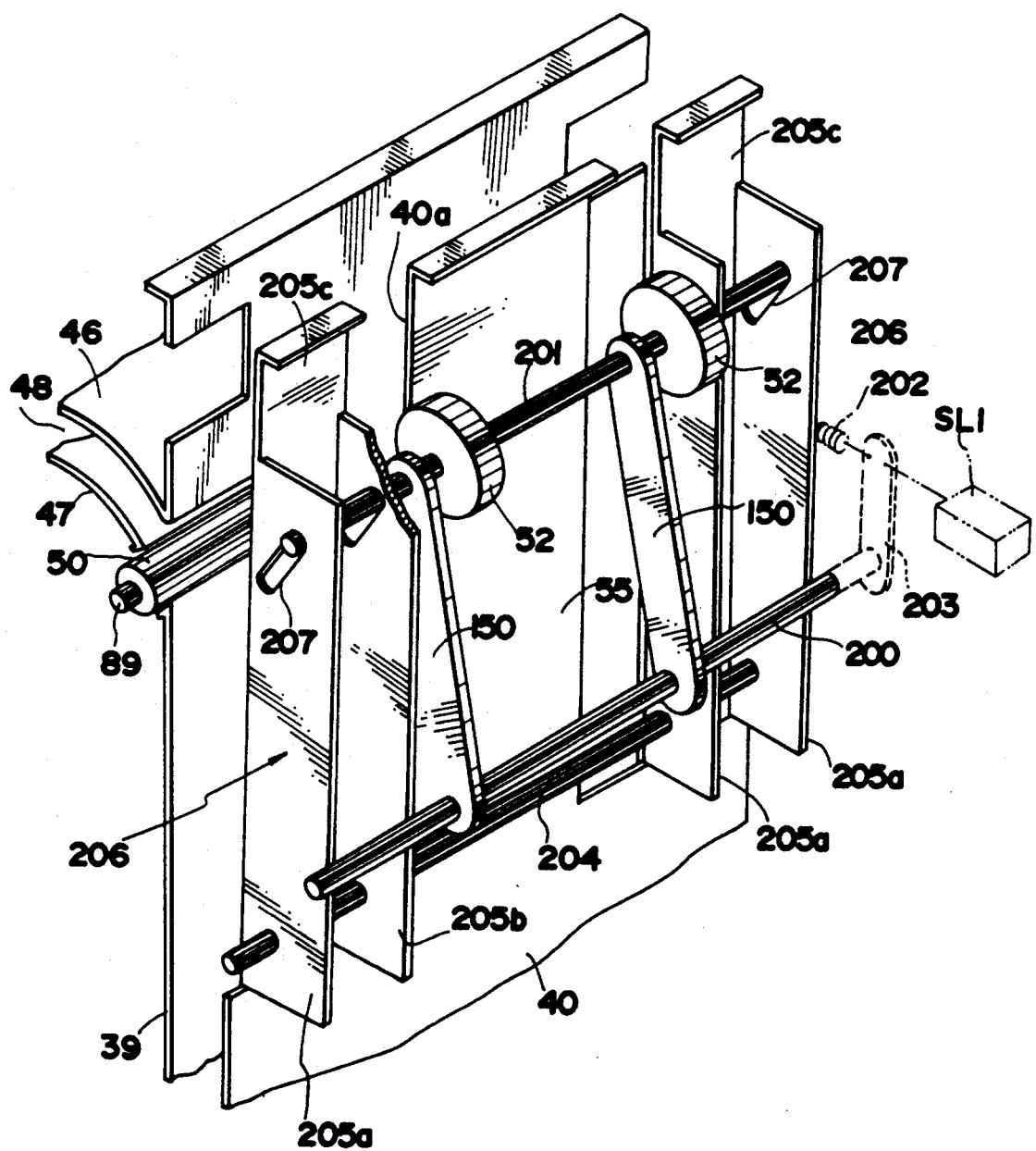
FIG. 12 is a perspective view of FIG. 11.

As shown in FIG. 12, a coiled tension spring 202 is connected by a lever 203 to the rotary shaft 200 for pressing the switchback rollers 52 against the drive roller 50. A solenoid SL1 is connected to the lever 203 for moving the switchback rollers 52 away from the drive roller 50 against the elastic force of the spring 202.

A support shaft 204 parallel to the rotary shaft 200 is mounted on an unillustrated frame or like member within the housing 20 like the rotary shaft 200. The guide member 206 is rotatably mounted on each end of the support shaft 204, comprises two operating portions 205a, 205b and a plate 205 interconnecting these portions, and generally U-shaped when seen from above. To pivotally move the guide members 206 as timed with the switchback rollers 52 by the pivotal members 150, the support shaft 201 is engaged in slots 207 formed in the operating portions 205a, 205b of the guide members 206.

The pivotal members 150, when moved, bring the switchback rollers 52 into pressing contact with the drive roller 50, whereby the recording medium transported backward by the drive rollers 43 and the driven rollers 45 is transported into the outlet channel 48 exactly in the same manner as in the first embodiment.

Furthermore, the second embodiment is similar to the first embodiment in respect of the number of switchback rollers, the operation of the sensors provided in the device for detecting the recording medium, the control circuit for operating the switchback device, etc. Thus, the second embodiment is operated by the same control process as the first.

Figure 13B:
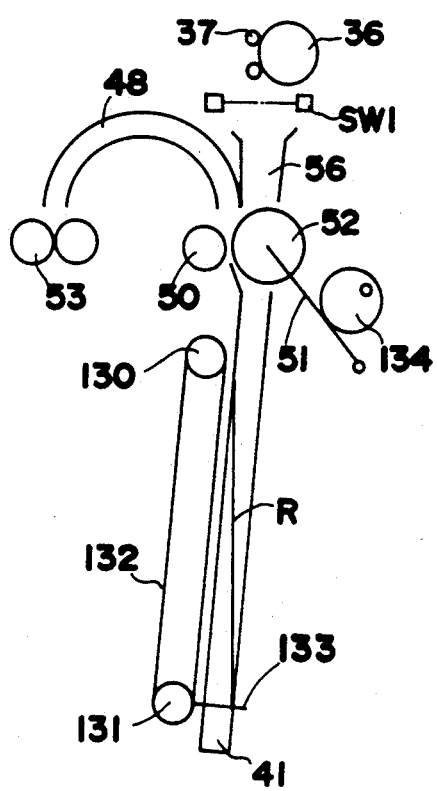
FIGS. 13 (A), (B) and (C) are diagrams showing stepwise the operation of another switchback device as a third embodiment of the invention.
Figure 13A:
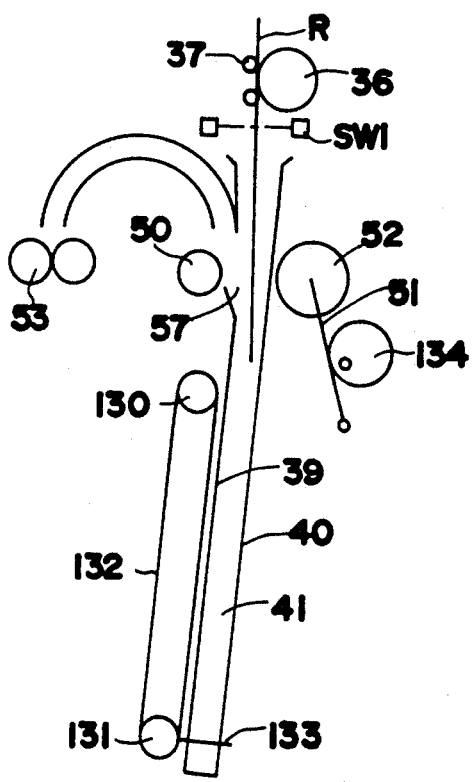
Figure 13C:
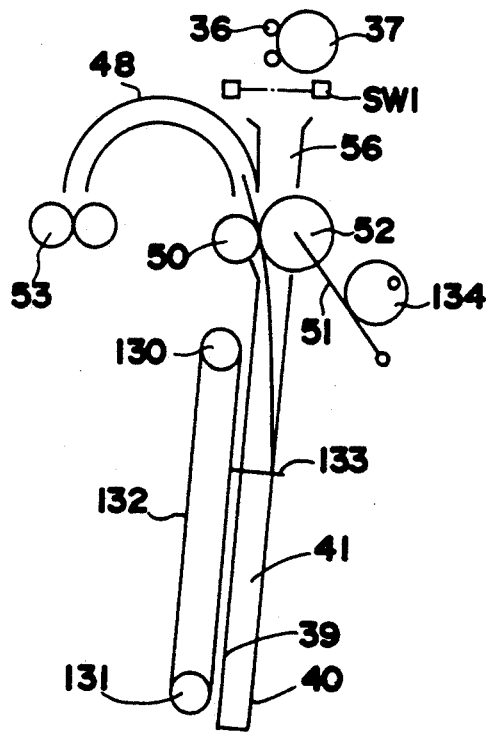

FIG. 13 shows reverse means included in another switchback device as a third embodiment of the invention. A belt 132 is reeved around two rollers 130, 131 disposed adjacent to the guide plate 39. The belt 132 has attached thereto a push lever 133 extending through the switchback channel 41. The medium R is exposed to an image with the push lever 133 in its lower limit position as seen in FIG. 13 (A) corresponding to FIG. 6 (A) showing the first embodiment. On completion of the exposure, the medium R falls onto the push lever 132 under gravity. After the passage of the medium R is detected by the sensor SW1, the switchback rollers 52 are pressed against the drive roller 50, and the medium R is transported into the outlet channel 48 through the steps shown in FIGS. 13 (B) and (C) as in the case of the first embodiment. In the present case, the sensor SW2 included in the first embodiment need not be provided; the reverse means of the third embodiment operates only for transporting the medium backward.

With the third embodiment shown in FIGS. 13 (A) to (C), the switchback rollers 52 are brought into or out of pressing contact with the drive roller 50 by a cam 134 instead of the solenoid SL1 used in the first embodiment. The cam 134 is usable also in the first embodiment for moving the switchback rollers 52. The pivotal member 51 is biased by the elastic force of an unillustrated spring, whereby the pivotal member 51 is held in pressing contact with the cam 134.

With the first to third embodiments of the present invention, the recording medium is first so transported as to be positioned always below the junction of the inlet channel, switchback channel and outlet channel, with at least one sensor acting to detect the position of the medium falling through the switchback channel, is thereafter transported upward and guided into the outlet channel by the switchback means. However, the recording medium may be transported upward directly into the outlet channel without resorting to the operation of the reverse means to move the medium downward. When the recording medium falls slowly from the scanning station into the switchback channel or is halted owing to curling while falling through the channel, the sensor detects this, whereupon the medium is transported further downward, then transported upward and guided into the outlet channel as in the first to third embodiments, whereas when the medium rapidly falls to a predetermined position, the medium is immediately transported upward from this position into the outlet channel without being transported further downward. This shortens the medium transport time.

Although the switchback channels included in the foregoing embodiments are of the slanting type only, the switchback channel can be vertical or horizontal.

Briefly, the first to third embodiments of switchback device of the invention have, as provided in a laser printer or like image forming apparatus, an inlet channel, a switchback channel in communication with the inlet channel, an outlet channel communicating with the junction of the two channels for delivering a recording medium from the switchback channel, reverse means for backwardly transporting toward the outlet channel the medium transported into the switchback channel from the inlet channel after the medium has been released from transport means disposed upstream from the inlet channel with respect to the medium transport direction ,and switchback means movable into the junction for guiding the medium from the switchback channel into the outlet channel. This arrangement makes it possible not only to transport the recording medium with a short channel positioned in a specified direction and provided downstream from the outlet channel with respect to the medium transport direction and also to transport the medium through the switchback channel at a speed irrelevant to the speed of transport of the medium by the transport means.

A fourth embodiment of the present invention is hereinafter described with reference to FIGS. 14 through 20.

With the exception of the switchback device of the fourth embodiment of the present invention, the construction of the apparatus, for example, the section from the recording media magazine to the laser beam scanning portion, is identical to that in the first, second and third embodiments of the invention and, accordingly, the same reference numbers are used. A description of the construction of the section behind exposure station 22 follows hereinafter.

Guide plates 39 and 40 are provided vertically downstream of exposure station 22 in the recording medium transport direction so as to have a fixed spacing therebetween, said space between said guide plates 39 and 41 forming a switchback channel 41 for accommodating the exposed recording medium. The path formed between the top end 303 of guide plate 39 and the top end 304 of guide plate 40 comprises a inlet channel 305 for delivering the recording medium discharged from exposure station 22 into switchback channel 41, said inlet channel 305 being linearly joined with switchback channel 41 by junction 57.

In order to transport the recording medium from switchback channel 41 into developing unit 24, said developing unit 24 and guide plate 39 have mounted therebetween arch-shaped upper and lower guide plates 46 and 47, the arrangement of said upper and lower guide plates 46 and 47 being such that an outlet channel 48 is formed therebetween. The outlet channel 48 is disposed adjacent to communicating opening 310 provided tot he junction 57 of guide plate 39.

Drive rollers 311 and driven rollers 312 are provided in the aforesaid junction 57 so as to retractably intrude into the passage at apertures 315 and 316 formed in guide plates 39 and 40. When the recording medium is gripped between rollers 311 and 312, said rollers form a transport means 313 for transporting said recording medium in inlet channel 305, switchback channel 41 and outlet channel 48.

To transport the recording medium in switchback channel 41 through outlet channel 48 and into developing unit 24, a set of feed rollers 53 are mounted between the developing unit 24 and the downstream section of guide plates 46 and 47 in the recording medium transport direction.

Because switchback channel 41, which is formed by guide 40, extends straight downward form exposure station 22 through inlet channel 305, the recording medium is transported from the exposure station 22 downwardly in a free state. Then when scanning of the sheet recording medium is completed, the sheet is switched back in path 41, transported through outlet channel 48, and introduced to developing unit 24 from the top. The exposed side of the sheet recording medium is oriented in the prescribed direction by introducing the sheet into developing unit 24 from the top through switchback channel 41. The recording medium is transported in developing unit 24 at a prescribed speed which is unrelated to the transport speed of transport rollers 37 because said medium is transported by being gripped between a set of rollers 311 and 312 which intrude into the junction 57, without said medium being interposed between the large diameter platen drum 36 and the aforesaid transport rollers 37. Further, transporting a scanned recording medium to developing unit 24 can also be accomplished by constructing a transport path linking the bottom of guide plates 39 and 40 with the top of said developing unit 24, such that transporting the recording medium from the guide plates 39 and 40, which are short in overall length, to the developing unit 24 is accomplished by reversing the transport direction and sending back the recording medium after it has been accommodated in the switchback channel 41.

Figure 14:
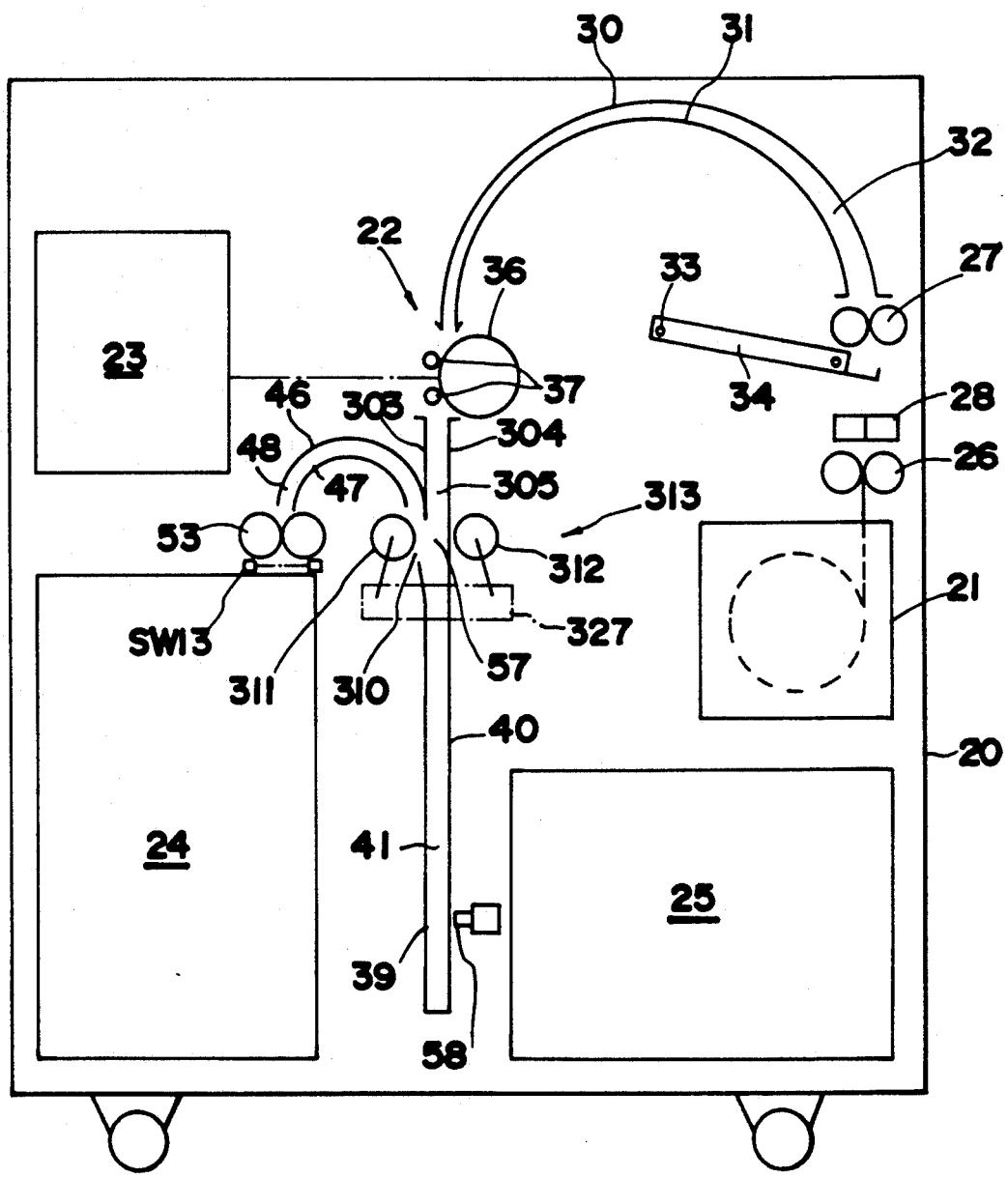
FIG. 14 is a sectional view schematically showing a laser printer having incorporated therein a fourth embodiment of the invention, i.e. a switchback device for recording medium.

As described above, the recording medium, having passed through exposure station 22, is transported within the inlet channel 305 by means of transport rollers 37. IN this transport process, the recording medium is separated from the exposure station 22 and drops downwardly into switchback channel 41 by force of its own weight because roller set 311 and 312 does not come into contact with said recording medium. The bottom of guide plates 39 and 40 is closed off because the recording medium must be received by the aforesaid drive rollers 311 and driven rollers 312 before said medium reaches the bottom of the path. A stopper 58 may be provided which can be made to intrude into switchback channel 41, as shown in FIG. 14, so that preventing the recording medium from reaching the bottom of said path can be reliably accomplished. Actuation of stopper 58 may be accomplished by means of a solenoid or like device not shown in the drawing.

Details of the section wherein drive rollers 311 and driven rollers 312 operate is hereinafter described with reference to FIGS. 15A through 15C and FIG. 16.

Figure 15A:
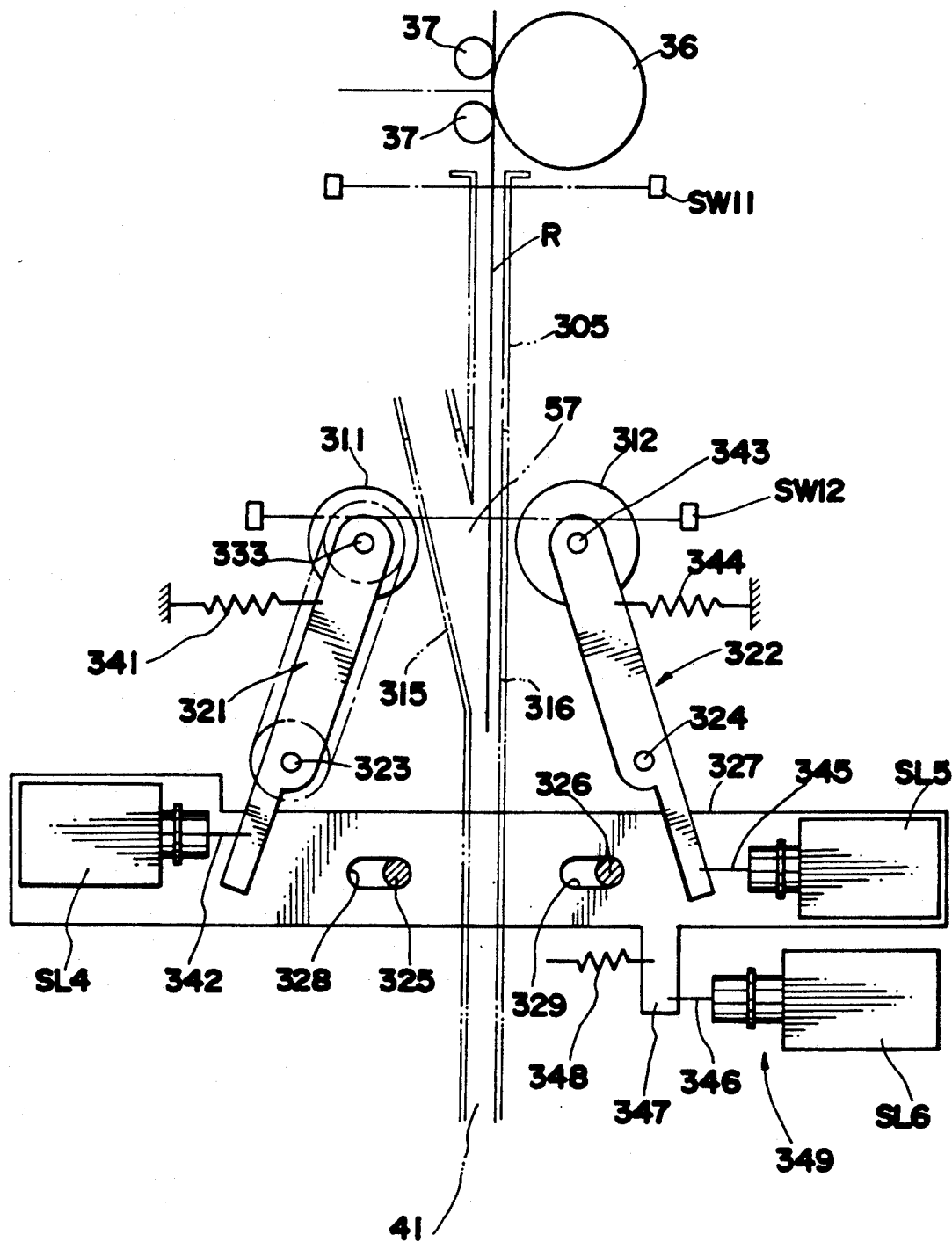
FIGS. 15 (A) is a sectional view showing drive and driven rollers included in the fourth embodiment of the invention, the view showing the rollers as retracted from the junction of an inlet channel and the switchback channel.
Figure 15B:
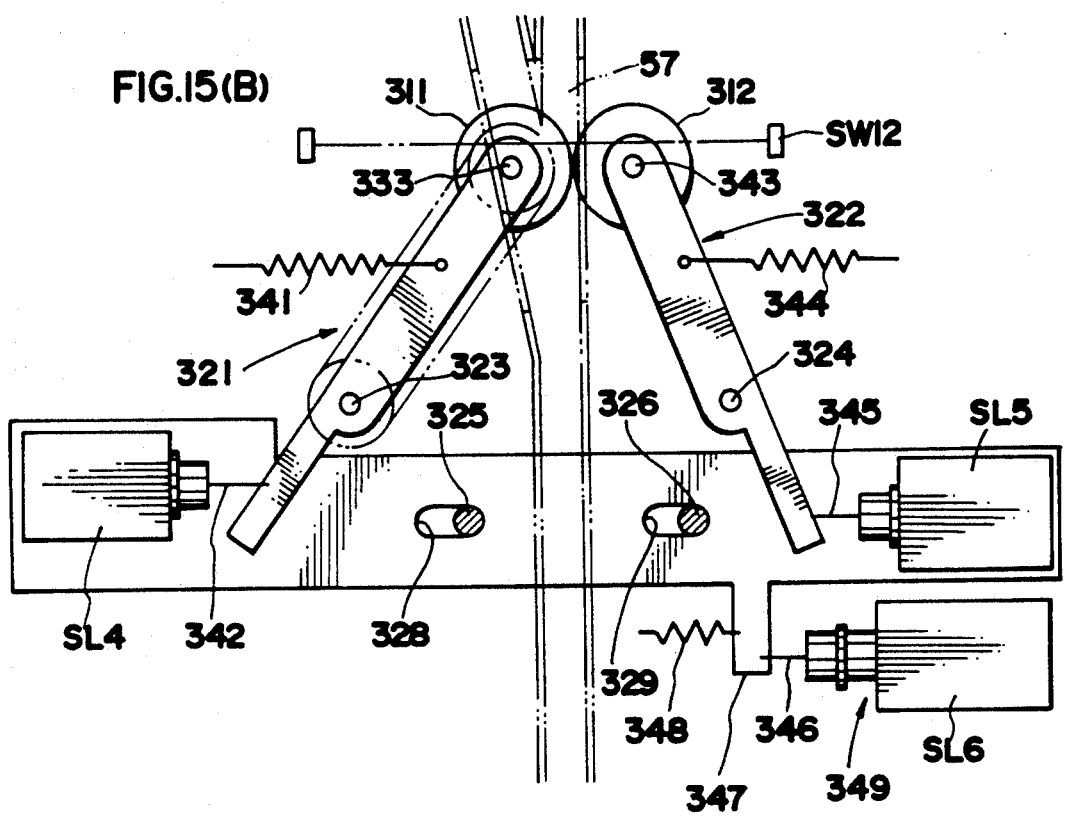
Figure 15C:
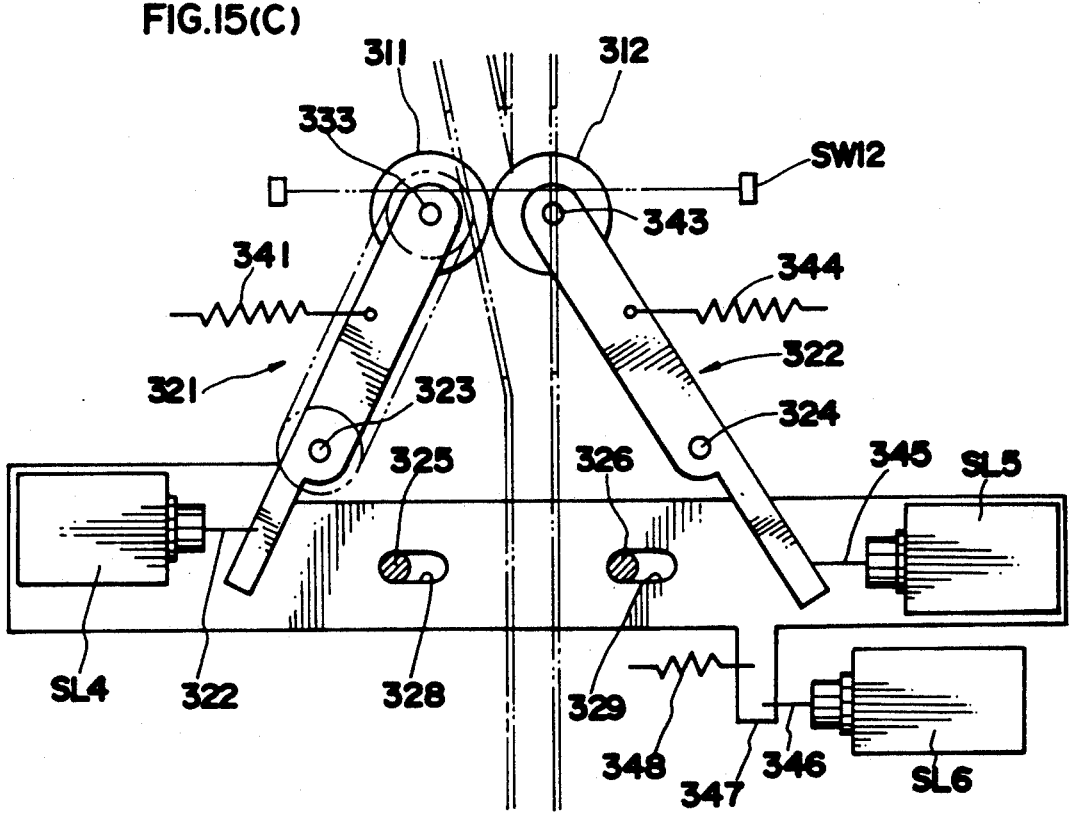

Drive rollers 311 are rotatably mounted to pivotal member 321, and driven rollers 312 are rotatably mounted to pivotal member 322, as shown in FIGS. 15A through 15C, said pivotal member 321 pivotal upon a center of oscillation located at drive shaft 323, and said pivotal member 322 oscillating upon a center of oscillation located at support shaft 324. Drive shaft 323 and support shaft 324 are each supported by bearings fixedly mounted to the inside of printer body 20, and are not shown in the drawings.

Two guide pins 325 and 326, which are fixedly attached to members not shown in the drawings but provided within printer body 20, project through slots 328 and 329, respectively, which are formed in reciprocating member 327. Reciprocating member 327 is disposed so as to be reciprocally moved to and fro horizontally while being supported by pins 325 and 326 inserted into the range of slots 328 and 329 respectively.

Figure 16:
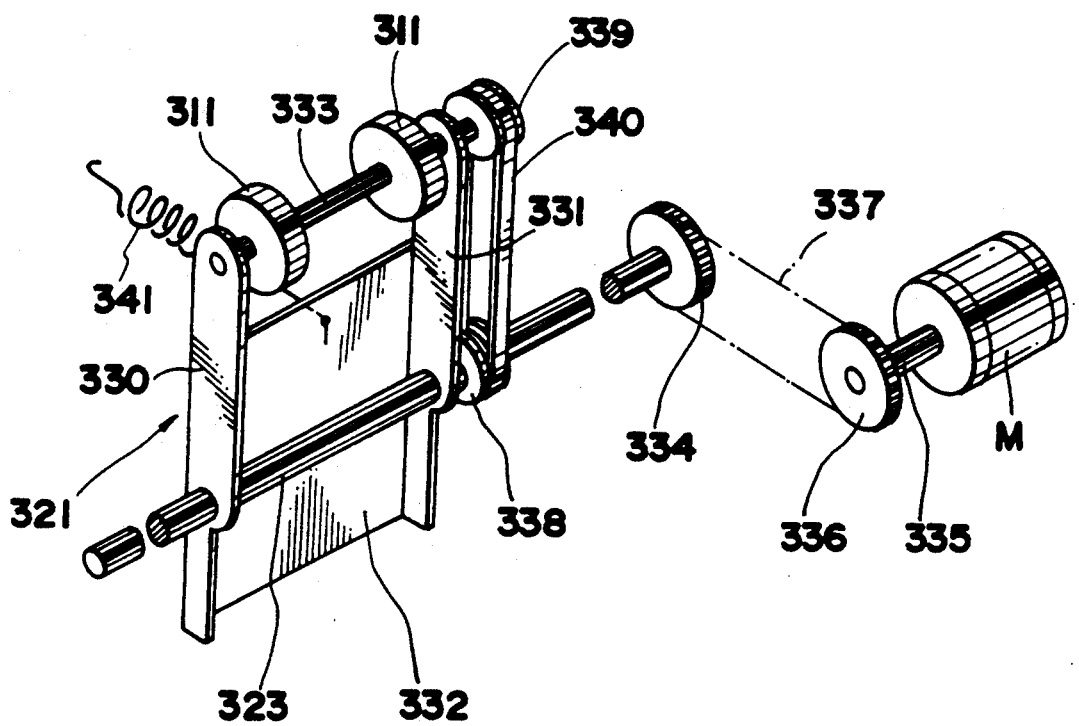
FIG. 16 is a perspective view of the drive rollers shown in FIG. 15 (A).

Details of the pivotal member 321 on the drive rollers 311 side are as shown in FIG. 16. Pivotal member 321 integrates two levers 330 and 331 and a face plate 332 which links said levers 330 and 331. A rotatable shaft 333 is rotatably mounted to the tips of each lever 330 and 331, said shaft 333 having two drive rollers 331 fixedly attached thereto.

In order to rotatably drive drive rollers 311 by the aforesaid arrangement, a gear 334 fixedly mounted to one end of drive shaft 323 and a gear 336 fixedly mounted to the drive shaft 335 of motor M are linked by a chain 337, and a pulley fixedly attached to said drive shaft 323 and a pulley 339 fixedly attached to rotating shaft 333 are connected by having a belt 340 looped therebetween. Thus, when drive shaft 323 is rotated by motor M by means of chain 337, said rotation is transmitted to rotating shaft 333 through belt 340, thereby rotating the two drive rollers 311 fixedly mounted to said rotating shaft 333.

One end of a coiled tension spring 341 is attached to face plate 332 of oscillating member 321 while the other end of said coil spring 341 is attached to a stationary component fixedly mounted to the interior of printer body 20 so as to cause the retraction of the drive rollers 311 from the position whereat they intrude into junction 57 by means of pivotal the pivotal member 321 counterclockwise, as shown in FIG. 15A. On the other hand, a drive roller solenoid SL4 is mounted on the aforesaid reciprocating member 327 and the solenoid actuating rod 342 is connected to pivotal member 321 so as to cause the intrusion of drive rollers 311 into the connective section 57 by means of pivotal the pivotal member 321 clockwise against the elastic force of the aforesaid spring 341.

Another pivotal member 322 is identical to that of the aforesaid pivotal member 321, with the exception of the drive mechanism of pulleys 338 and 339 and belt 340 and the like. Driven rollers 312 comprise two rollers which correspond to drive rollers 311, said driven rollers 312 being attached to a support shaft 343 which is mounted to an pivotal member 322, and a coiled tension spring 344 is attached to pivotal member 322 so as to cause the retraction of the driven rollers 312 from the position whereat they intrude into junction 57 by oscillating the pivotal member clockwise. On the other hand, a driven roller solenoid SL5 is mounted on the aforesaid reciprocating member 327 and the solenoid actuating rod 345 is connected to pivotal member 322 so as to cause the intrusion of drive rollers 312 into the junction 57 by means of pivotal the pivotal member 322 counterclockwise against the elastic force of the aforesaid spring 344.

As previously described, when the reciprocating member 327 is moved to the right, as shown in FIG. 15C, both pivotal members 321 and 322 oscillate counterclockwise upon centers of oscillation located at drive shaft 323 and support shaft 324 respectively, thereby causing drive rollers 311 and driven rollers 312 to travel to the left because the respective pivotal members 321 and 322 are connected to reciprocating member 327 via solenoids SL4 and SL5.

When a recording medium is accommodated in switchback channel 41 and electric power is supplied to the aforesaid solenoids SL4 and SL5, drive rollers 311 and driven rollers 312 are caused to intrude into the three-passage junction 57 which connects inlet channel 305, switchback channel 41 and outlet channel 48, thus the recording medium is gripped between said drive rollers 311 and driven rollers 312. In order to switch the aforesaid gripping position between the inlet channel and outlet channel, the actuating rod 346 of a position-changing solenoid SL6 is connected to a projection 347 of the aforesaid reciprocating member 327, while said position-changing solenoid SL6 is fixedly attached to the printer body 20. When electric power is supplied to the aforesaid solenoid SL6, the reciprocating member 327 is moved to the right, as shown in FIG. 15C. One end of a coiled tension spring 348 is attached to projection 347 to move the reciprocating member 327 in the reverse direction, while the other end of said spring is fixedly attached to the interior of printer body 20 (not shown in the drawing). Reciprocating member 327 and solenoid SL6 comprise a grip position-changing means for changing the position at which the recording medium is gripped between the rollers 311 and 312, said reciprocating member 327 being disposed so as to be reciprocally moved to and fro horizontally by means of solenoid SL6 and the electric force of spring 348.

As shown in FIG. 16, drive rollers 311 comprise two rollers, and driven rollers 312 comprise two rollers which correspond to the aforesaid drive rollers 311. The aforesaid apertures 315 and 316 have suitable areas so as to allow the intrusion and retraction of rollers 311 and 312. Therefore, the two rollers provided to each roller 311 and 312 are so provided to minimize and narrow the aperture area required for each aperture 315 and 316, and thereby preventing jamming of the recording medium. Accordingly, the number of rollers employed in each roller 311 and 312 will therefore depend on the width of the recording medium used, and the use of more than two rollers or only a single roller is possible.

As shown in FIG. 15A, a sensor SW11 is provided to the exposure station 22 to detect the completion of the exposure of the recording medium, and a sensor SW12 is provided at the contacting positions of drive rollers 311 and driven rollers 312 to detect when the top edge of the recording medium accommodated in switchback channel 41 reaches the position Of connective section 57. Further, a sensor SW13 is provided downstream from the supply roller 53 in the recording medium transport direction, as shown in FIG. 14, to detect the recording medium entering the developing unit after passes through the aforesaid supply roller.

Figure 18:
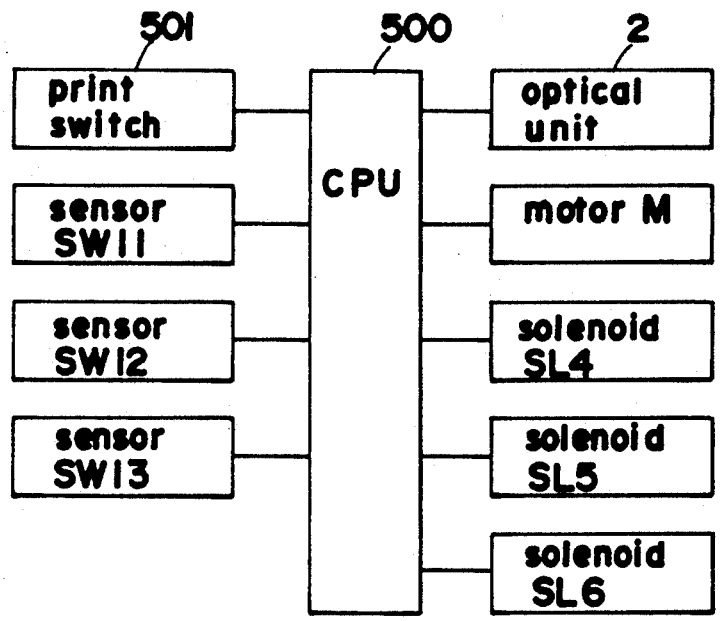
FIG. 18 is a block diagram showing a control system for the switchback device of the fourth embodiment.

The construction of the aforesaid sensors SW11, SW12 and SW13 are identical to those described in the first embodiment. FIG. 18 is a diagram of a control circuit used for operating the switching device of the present invention. A print switch 501 for commanding the start of the laser printer print function is connected to a microcomputer or like central processing unit (CPU) 500. Sensors SW11, SW12 and SW13 are also connected to CPU 500 respectively. Control signals are transmitted from CPU 500 to the optical unit 23, motor M and the three solenoids SL4, SL5 and SL6.

Figure 19:
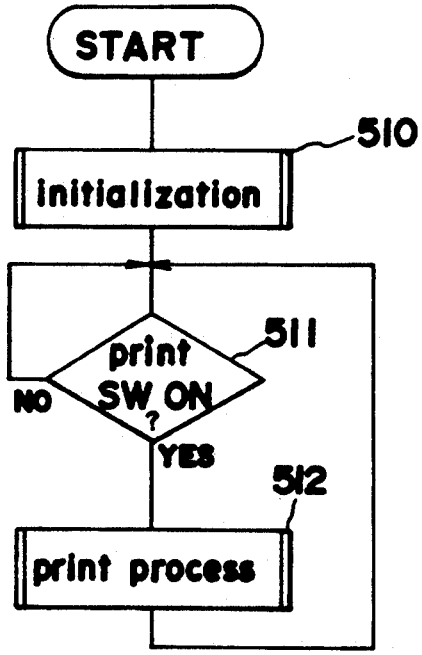
FIG. 19 is a flow chart showing the operation process to be executed by the control system of FIG. 18.

FIG. 19 shows a main flow chart describing the control sequence for a laser printer incorporating the switchback device of the present invention. When the laser printer is started, the printer is initialized in step 510, and when, in this state, the print switch 501 is judged to be ON in step 511, the print process routine indicated in step 512 is executed.

Figure 20:
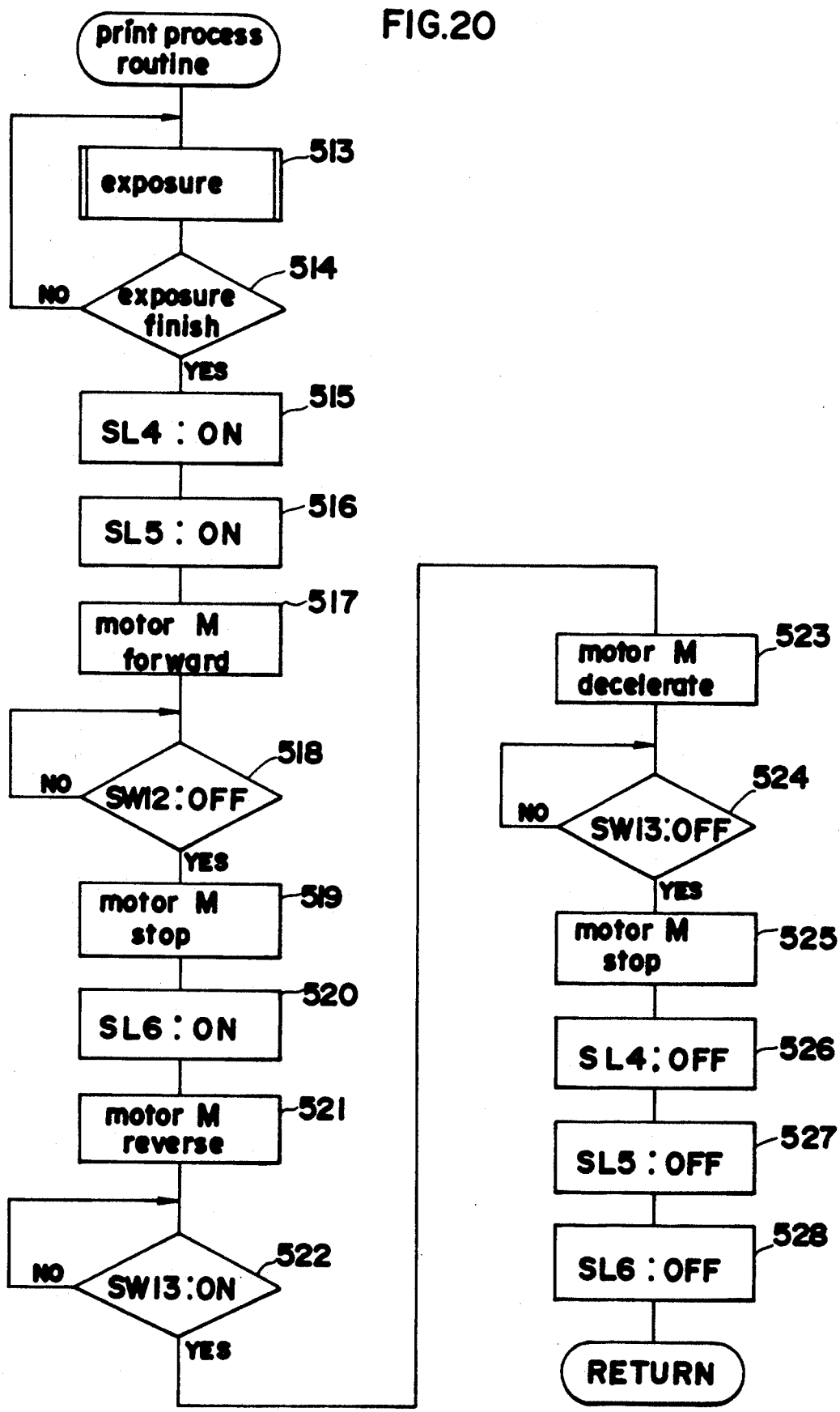
FIG. 20 is a flow chart showing the print process subroutine of FIG. 19 in detail.

FIG. 20 is a flow chart showing details of the print process routine indicated in step 512. This print process routine is explained hereinafter with reference to the switchback device of the present invention in the operational states described in FIGS. 17A through 17C.

The recording medium, which is stored in a rolled state in magazine 21, is repeatedly output therefrom and cut into sheets R of specified length by cutter unit 28, and then transported into the transport path 32 by push lever 34. Thus, when the leading edge of recording medium R reaches the exposure station 22, the recording medium R is exposed with a laser beam emitted by the optical unit 23 so as to accomplish image exposure, as shown in step 513. At this time, with the image having been exposed on the recording medium R, drive rollers 311 and driven rollers 312 are maintained in a mutually separated state by means of the elastic force applied to each roller by springs 341 and 344 respectively, i.e., drive rollers 311 and driven rollers 312 are retracted from guide plates 39 and 40. When the passage of trailing edge of the recording medium R is detected by sensor SW11, the exposure process is judged to be completed in step 514, and immediately solenoids SL4 and SL5 are switched ON, as shown in steps 515 and 516. Drive rollers 311 and driven rollers 312 therefore make pressure contact with recording medium R gripped therebetween. However, stopper 58 may be previously positioned so as to intrude into switchback channel 41, as shown in FIG. 14.

At this time, reciprocating member 327 is pulled to the far left side by the elastic force of spring 348, as shown in FIG. 15B, and recording medium R is stopped in position in inlet channel 305 and switchback channel 41 by the respective rollers 311 and 312, as shown in FIG. 17B. Thus, when the reciprocating member 327 is at the far left position, solenoids SL4 and SL5 actuate, and pivotal member 322 oscillates to a greater degree than does pivotal member 321, as shown in FIG. 15B. When motor M starts forward rotation in step 517 with the mechanism in the aforesaid state, recording medium R travels downward. When the top edge of recording medium R reaches junction 57 and is detected by sensor SW12, the arrival of said sheet R is determined in step 518 and motor M is stopped in step 519. After motor M once stops, solenoid SL6 is switched ON in step 520, and reciprocating member 327 is moved to the right, as shown in FIG. 15C. Drive rollers 311 and driven rollers 312 therefore make pressure contact through recording medium R, and while said rollers are in this state, pivotal member 321 is oscillated counterclockwise with the center of oscillation on rotating shaft 323, while similarly pivotal member 322 is oscillated in the same direction with the center of oscillation on support shaft 324, so that position at which sheet R is pressure-gripped by said drive rollers 311 and driven rollers 312 is moved into the output passage. The aforesaid state of the mechanism is shown in FIG. 17C.

Then, when motor M reverses as shown in step 521, the recording medium R, which is gripped between drive rollers 311 and driven rollers 312, is inserted into outlet channel 48, and transported toward developing unit 24. When the leading edge of recording medium R is detected by sensor SW13, said detection is judged in step 522, and motor M decelerates in step 523. This deceleration of motor M corresponds to the developing speed in developing unit 24, although the transport speed has up to this time been greater than the developing speed. A rapid switchback operation is thereby accomplished.

If sensor SW13 is switched OFF in step 524, i.e., if it is judged the recording medium R has passed supply roller 53, then motor M is stopped in step 525, and solenoid SL4, SL5 and SL6 are switched OFF, as shown in steps 526 through 528 respectively. Reciprocating member 327, drive rollers 311 and driven rollers 312 are returned to the positions indicated in FIGS. 15A an 17A, in preparation for a subsequent print process. Although the switchback extends perpendicularly in the aforesaid embodiments, it may also be disposed horizontally, or have an inclined configuration as described in the First through Third Embodiments of the present invention.

The Fourth Embodiment of the switchback device of the present invention provides in the image forming device of a laser printer or the like, an inlet channel, switchback channel connected to said inlet channel, and an output channel connected to a junction which connects said inlet channel and said switchback channel for transporting the recording medium accommodated in the aforesaid switchback channel, and the recording medium, which has been delivered to the switchback channel from the inlet channel, is gripped by a transport means, i.e. a set of rollers, when the restraint placed on the recording medium by the input means disposed upstream of said inlet channel in the recording medium transport direction is removed. The position at which the recording medium is pressure-gripped by said rollers is moved between the input and outlet channels by grip position-changing means, so that the recording medium is transported backward. Accordingly, the arrangement of the switchback device according to the Fourth Embodiment makes it possible not only to transport the recording medium with a short channel positioned in a specified direction and provided downstream from the outlet channel with respect to the recording medium transport direction and also to transport the recording medium through the switchback channel at a speed irrelevant to the speed of transport of the recording medium by the transport means.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transport device for transporting a sheet medium comprising:
   an inlet channel;
   a switching channel communicating with said inlet channel at a junction;
   an outlet channel connected to said junction of the inlet channel and the switching channel;
   transport means including a pair of inlet rollers which grip and transport the sheet medium in a sheet medium transport direction into the switching channel through the inlet channel;
   reverse means located downstream from the junction with respect to the sheet medium transport direction and including a pair of reverse rollers which grip the sheet medium transported by the inlet rollers and transport the sheet medium in a direction opposed to the sheet medium transport direction;
   switching means located at the junction and including a pair of switching rollers at least one of which is movable from a first position to a second position for guiding the sheet medium to the outlet channel, said movable switching roller being out of contact with the other switching roller in the first position and being in contact with the other switching roller in the second position;
   first detecting means for detecting that the trailing end of the sheet medium passes the inlet rollers;
   second detecting means for detecting that the sheet medium has reached the predetermined position in the switching channel by the reverse rollers of the reverse means;
   first control means for controlling said movable switching roller so as to be in the first position when the sheet medium is transported from the inlet channel into the switching channel by the inlet rollers so that the sheet medium transported into the switching channel is gripped and transported by the reverse rollers to a predetermined position in the switching channel; and
   second control means for controlling said movable switching roller so as to be in the second position when a trailing end of the sheet medium reaches a predetermined position in the switching channel so that the sheet medium transported in the switching channel by the reverse rollers is gripped between the switching rollers and guided to the outlet channel.

2. A transport device for transporting a sheet medium comprising:
   an inlet channel;
   a switching channel communicating with said inlet channel at a junction;

an outlet channel connected to said junction of the inlet channel and the switching channel;

first transport means for transporting the sheet medium in a transport direction through the inlet channel and into the switching channel;

second transport means located at the junction and including a pair of rollers at least one of which is movable from a first position to a second position, said movable rollers being out of contact wit the other rollers in the first position and being in contact with the other roller in the second position for receiving the sheet medium transported in the switching channel and for transporting the sheet medium in a direction opposed to the sheet medium transport direction to the outlet channel;

determining means for determining when a trailing end of the sheet medium passes the first transport means; and control means for controlling the movable roller of the second transport means so as to be in the first position when the sheet medium is transported from the inlet channel into the switching channel by the first transport means and so as to be in the second position when said determining means determines that the trailing end of the sheet medium passes the first transport means.

3. In a transport device for transporting a sheet medium which comprises an inlet channel, a switching channel communicating with said inlet channel at a junction, and an outlet channel connected to said junction of the inlet channel and the switching channel, a method comprising the steps of:

transporting the sheet medium in a sheet medium transport direction into the switching channel through the inlet channel by transport rollers;

moving at least one reverse roller of a pair of reverse rollers into the switching channel when a trailing end of the sheet medium passes the transport rollers;

receiving and gripping by the reverse rollers the sheet medium transported into the switching channel;

transporting the sheet medium in a direction opposed to the sheet medium transport direction along the switching channel by use of the reverse rollers;

moving at least one switching roller of a pair of switching rollers into the junction for receiving and gripping the sheet medium transported by the reverse rollers; and transporting the sheet medium into the outlet channel by use of the switching rollers.

4. A method as claimed in claim 3, including the steps of first detecting that the trailing end of the sheet medium passes the transport rollers, and thereafter detecting when the sheet medium has reached a predetermined position in the switching channel.

5. A sheet transporting device provided in an image forming apparatus, said sheet transporting device comprising:

a first transport channel for guiding a sheet in a predetermined direction, an image being formed on the sheet during transportation of the sheet in said first transport channel;

a second transport channel for guiding the sheet in a substantially opposed direction to the predetermined direction; and reverse means operatively associated with the first and second transport channels for receiving the sheet transported in the first transport channel and for transporting the sheet into the second transport channel, said reverse means including at least a pair of transport rollers, said transport rollers receiving the sheet transported in the first transport channel while being out of contact with each other during formation of the image on the sheet in the first transport channel and being in contact with each other in order to grip and transport the sheet into the second transport channel upon completion of the formation of the image on the sheet.

6. The sheet transporting device as claimed in claim 5, wherein the transport rollers contact each other when a trailing end of the sheet having the image formed thereon reaches an outlet portion of the first transport channel.

7. The sheet transporting device as claimed in claim 5, wherein one of the transport rollers is provided with a guide member for helping to ensure that the sheet is guided between the transport rollers, said guide member being pivotally mounted in interlocking relation with the transport rollers.

8. The sheet transporting device as claimed in claim 5, wherein the reverse means further includes a reverse member, said reverse member receiving the sheet transported in the first transport channel upon completion of the image formation on the sheet whereupon the transport rollers contact each other for positioning a trailing end of the sheet received by said reverse member at an inlet portion of the second transport channel.

9. The sheet transporting device as claimed in claim 8, wherein the reverse member includes a rotatable belt.

10. The sheet transporting device as claimed in claim 5, wherein the transport rollers receive the sheet at an outlet portion of the first transport channel upon completion of the image formation on the sheet and then contact each other to position the sheet at an inlet portion of the second transport channel.

11. The sheet transporting device as claimed in claim 10, wherein the transport rollers receive the sheet when a trailing end of the sheet passes through an image forming portion in the image forming apparatus.

12. The sheet transporting device according to claim 5, including means for detecting when a trailing end of the sheet in the first transport channel has reached a predetermined position and for causing said transport rollers to contact one another when the trailing end of the sheet has reached said predetermined position.

* * * * *